US007196733B2

(12) United States Patent
Aratani et al.

(10) Patent No.: US 7,196,733 B2
(45) Date of Patent: Mar. 27, 2007

(54) APPARATUS FOR RECEIVING BROADCAST DATA, METHOD FOR DISPLAYING BROADCAST PROGRAM, AND COMPUTER PROGRAM

(75) Inventors: Shuntaro Aratani, Tokyo (JP); Katsuhiro Miyamoto, Kanagawa (JP); Takashi Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 606 days.

(21) Appl. No.: 10/347,863

(22) Filed: Jan. 22, 2003

(65) Prior Publication Data

US 2003/0142236 A1    Jul. 31, 2003

(30) Foreign Application Priority Data

Jan. 28, 2002   (JP)   ............................ 2002-018660
Jan. 29, 2002   (JP)   ............................ 2002-020217

(51) Int. Cl.
*H04N 9/74* (2006.01)
*H04N 1/393* (2006.01)
*H04N 5/46* (2006.01)

(52) U.S. Cl. ...................... 348/581; 348/565; 348/564; 348/569; 348/555; 382/298; 345/472

(58) Field of Classification Search ................ 348/581, 348/565, 564, 704, 569, 555, 556, 445; 382/298, 382/299; 345/472, 472.1, 472.2, 630
See application file for complete search history.

(56) References Cited

U.S. PATENT DOCUMENTS 5,650,827 A * 7/1997 Tsumori et al. ............... 725/59

5,828,351 A * 10/1998 Wu ............................. 345/11
5,912,710 A    6/1999 Fujimoto ...................... 348/445
6,473,088 B1 * 10/2002 Matsumoto et al. ......... 345/530
6,493,008 B1 * 12/2002 Yui ............................. 715/840
6,714,254 B2 * 3/2004 Enomoto ..................... 348/564
6,885,408 B2 * 4/2005 Hirano ........................ 348/588
6,961,097 B2 * 11/2005 Yui ............................. 348/584

(Continued)

FOREIGN PATENT DOCUMENTS

JP    05-336445    12/1993

(Continued)

OTHER PUBLICATIONS

European Search Report dated Mar. 24, 2004 (Ref. No. 2855230).

*Primary Examiner*—David Ometz
*Assistant Examiner*—Jean W. Désir
(74) *Attorney, Agent, or Firm*—Fitzpatrick, Cella, Harper & Scinto

(57) ABSTRACT

A data broadcasting receiver apparatus includes a receiver for receiving image data of the image of an object and size information relating to the object, transmitted through data broadcasting, an input unit for inputting screen information relating to a display screen of a display, a scaling unit for determining a scale factor of the object image based on the screen information input by the input unit and the size information received by the receiver so that the object image is displayed on the display at a predetermined size, and a display control unit for controlling the display to display the object image expanded or contracted at the scale factor determined by the scaling unit.

41 Claims, 32 Drawing Sheets

U.S. PATENT DOCUMENTS

| | | | | |
|---|---|---|---|---|
| 2002/0019982 | A1 | 2/2002 | Aratani et al. | 725/59 |
| 2002/0063797 | A1 | 5/2002 | Aratani et al. | 348/553 |
| 2002/0089610 | A1 | 7/2002 | Ohno et al. | 348/734 |

FOREIGN PATENT DOCUMENTS

| | | |
|---|---|---|
| JP | 5-336445 | 12/1993 |
| JP | 7-210608 | 8/1995 |
| JP | 07-210608 | 8/1995 |
| JP | 9-6944 | 1/1997 |
| WO | WO 01/35338 | 5/2001 |
| WO | WO 01/73525 | 10/2001 |
| WO | WO 01/74050 | 10/2001 |

* cited by examiner

FIG. 4

```
<!DOCTYPE dbc SYSTEM "http://www.xxx.co.jp/dbc.dtd">
<head>
<titleData DATA SHOPPING</title>

<script language="JabaScript">
var realenable = false;

function initialize(){
   realenable = Browser.GetBrowserSupport("realsize")
      var a=document.getElementById("real_btn");
   if(realenable==true){
      a.style.visibility="visible";
   }
   else{
      a.style.visibility="hidden";
   }
}
</script>
</head>

<body onLoad="initialize()">
<div style="position:absolute; font-size:24; top:20; left:40; width:1696; height:32 visibility:visible;" >
おじいちゃんの置時計
</div>
<div style="position:absolute; top:60; left:40; width:1696; height:856 visibility:visible;">   }(A)
 <object id="live",type="video/mpeg2" data="00"></object>
</div>
<div style="position:absolute; top:100; left:1760; width:136 height:64 visibility:visible;">   }(B)
 <a href="spec.htm">
   <object id="btn1",type="image/jpeg" data="btn_spec.jpg"></object>
</a>
</div>
<div style="position:absolute; top:200; left:1760; width:136 height:64 visibility:visible;">   }(C)
 <a href="imgall.htm">
   <object id="btn2",type="image/jpeg" data="btn_all.jpg"></object>
</a>
</div>
<div style="position:absolute; top:300; left:1760; width:136 height:64 visibility:visible;">   }(D)
 <a href="img_zoom.htm">
   <object id="btn3",type="image/jpeg" data="btn_zoom.jpg"></object>
</a>
</div>
<div style="position:absolute; top:400; left:1760; width:136 height:64;">   }(E)
 <a href="img_real.htm">
   <object id="btn4",type="image/jpeg" data="btn_real.jpg"></object>
</a>
</div>
</body>
```

FIG. 9

```
<!DOCTYPE dbc SYSTEM "http://www.xxx.co.jp/dbc.dtd">
<head>
<titleData DATA SHOPPING</title>

<script language="JavaScript">
var height,width,size,ratio;
var dst_height,dst_width;
var rw_height, rw_width;
var mov_height, mov_width;
var P, K, Zx, Zy;

var src_file = "";
var src_height, src_width, src_dpi;

function initialize(){
   src_file = "camera_all.jpg";          ┐
   src_height = 1024;                    │(A)
   src_width = 768;                      │
   src_dpi= 100;                         ┘

   getparameter();        }(B)
   calculate();           }(C)

   if( check()==false ){                 ┐
      src_file = "camera_zoom.jpg";      │
      src_height = 1024;                 │(D)
      src_width = 768;                   │
      src_dpi= 300;                      │
      calculate();                       ┘
   }

   adjustwindow();        }(E)
}

function getparameter(){
   height = Browser.GetScreeninfo("height");     ┐
   width = Browser.GetScreenInfo("width");       │(F)
   size = Browser.GetScreenInfo("size");         │
   ratio = Browser.GetScreenInfo("ratio");       ┘
}

function calculate(){                                   ┐
   if(height==480){                                     │
      if(ratio==1){                                     │
         K=height(=180)/(size*(9/18.37559))             │
         Zy=K/src_dpi;                                  │
         Zx=Zy/1.185;                                   │
      }                                                 │
      else{                                             │(G)
         K=height(=480)/(size*(3/5))                    │
         Zy=K/src_dpi;                                  │
         Zx=Zy/0.888;                                   │
      }                                                 │
   }                                                    │
   else{                                                │
      K=height(=1080)/(size*(9/18.37559))               │
      Zy=k/src_dpi;                                     │
      Zx=Zy;                                            ┘
   }
}
```

FIG. 10

```
function check(){
   if( Zy>4 && (dst_height>height*70/100) ){
      return false;
   }
   else{
      return true;
   }
}                                                          (H)
function adjustwindow(){
   dst_height = src_height*Zy;
   dst_width = src_width*Zx;
   if( dst_height>height*70/100){
      rw_height = height*70/100;
      rw_width = width*70/100;
      mov_height = height*30/100;
      mov_width = width*30/100;
   }
   else{
      rw_height = dst_height;
      rw_width = dst_width;
      mov_height = height-dst_height;
      mov_width = width-dst_width;
   }                                                       (I)
   document.all.RealImg.data =sec_file;
   document.all.RealImg.style.width =dst_width;
   document.all.RealImg.style.height= dst_height;
   document.all.RealImg.data =sec_file;
   document.all.RealImg.style.top = 0;
   document.all.RealDiv.style.left = 0;
   document.all.RealDiv.style.width = rw_width;
   document.all.RealDiv.style.height = rw_height;
   document.all.LiveDiv.style.top = rw_width;
   document.all.LiveDiv.style.left = 0;
   document.all.LiveDiv.style.width = mov_width;
   document.all.LiveDiv.style.height = mov_height;
   document.all.Live.style.top = rw_width;
   document.all.Live.style.left = 0;
   document.all.Live.style.width = mov_width;
   document.all.Live.style.height = mov_height;}
</script>
</head>

<body onLoad="initialize()">

<div id="RealDiv" style="position:absolute; visibility:visible;">
   <object id="RealImg",type="image/jpeg"></object>
</div>
<div id="LiveDiv" style="position:absolute; visibility:visible;">
<object id="Live",type="video/mpeg2" data="00"></object>
</div>
<div style="position:absolute; top:800; left:1760; width:136 height:64
         visibility:visible;">
<a href="startup.htm">
   <object id="btnback2",type="image/jpeg"data="btn_back.jpg"></object>
</a>
</div>
</body>
```

height = NUMBER OF PIXELS IN HEIGHT DIRECTION IN STILL IMAGE PLANE
ratio = ASPECT RATIO OF DISPLAY (16 : 9 = 1, 4 : 3 = 0)
src_dpi = NUMBER OF PIXELS PER INCH IN SOURCE IMAGE
K = NUMBER OF PIXELS PER INCH IN DISPLAY
Zx = HORIZONTAL ZOOM RATIO TO BE APPLIED TO SOURCE IMAGE
Zy = VERTICAL ZOOM RATIO TO BE APPLIED TO SOURCE IMAGE dst_height = NUMBER OF PIXELS SUBSEQUENT TO EXPANSION PROCESS OF SOURCE IMAGE IN HEIGHT DIRECTION height = NUMBER OF PIXELS OF BROWSER WINDOW IN HEIGHT DIRECTION Zy = VERTICAL ZOOM RATIO TO BE APPLIED TO SOURCE IMAGE

FIG. 14 dst_height = NUMBER OF PIXELS IN HEIGHT DIRECTION SUBSEQUENT TO EXPANSION PROCESS OF SOURCE IMAGE dst_width = NUMBER OF PIXELS IN WIDTH DIRECTION SUBSEQUENT TO EXPANSION PROCESS OF SOURCE IMAGE height = NUMBER OF PIXELS OF BROWSER WINDOW IN HEIGHT DIRECTION width = NUMBER OF PIXELS OF BROWSER WINDOW IN WIDTH DIRECTION real_height = NUMBER OF PIXELS OF REAL-SIZE IMAGE DISPLAY WINDOW IN HEIGHT DIRECTION real_width = NUMBER OF PIXELS OF REAL-SIZE IMAGE DISPLAY WINDOW IN WIDTH DIRECTION mov_height = NUMBER OF PIXELS OF MOVING WINDOW IN HEIGHT DIRECTION mov_width = NUMBER OF PIXELS OF MOVING WINDOW IN WIDTH DIRECTION

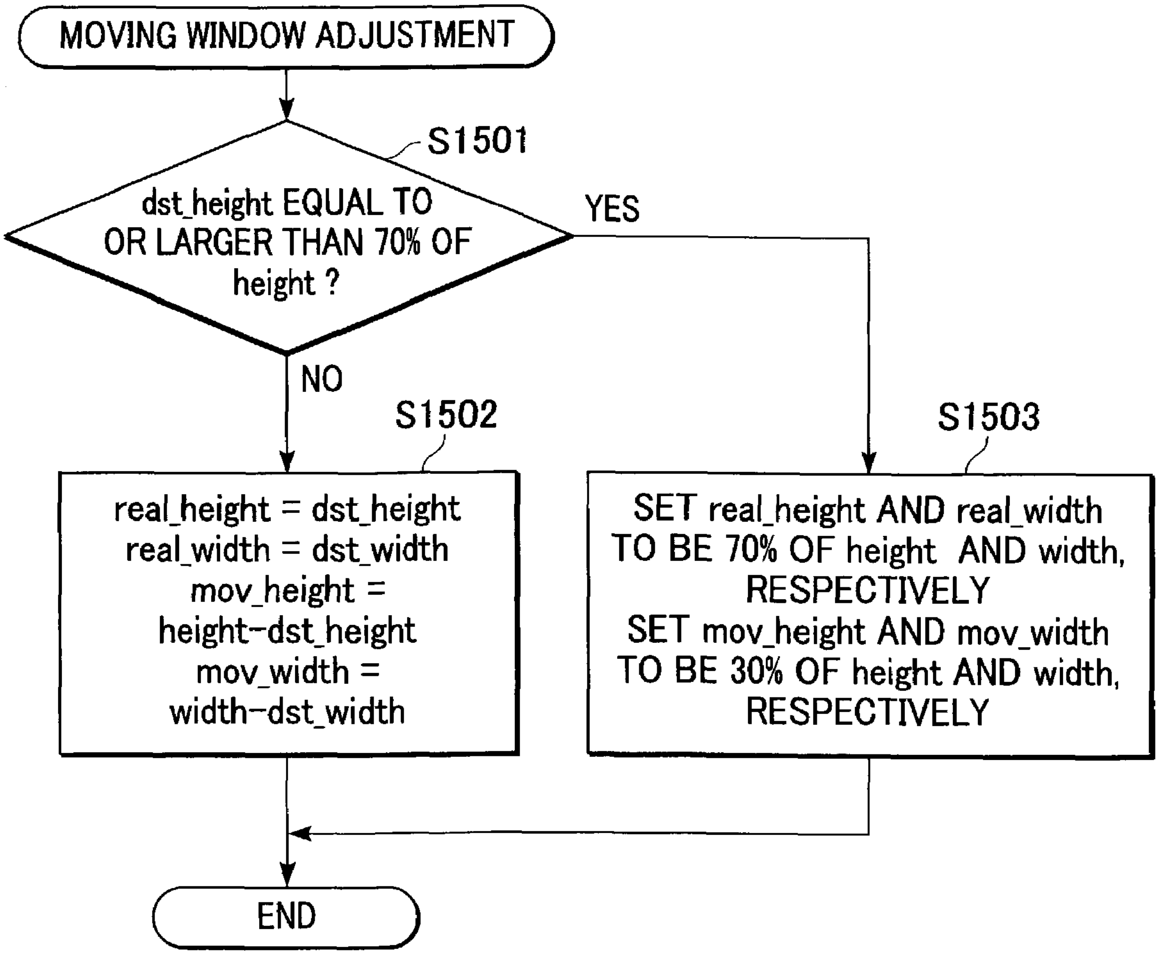

FIG. 19

```
<!DOCTYPE dbc SYSTEM "http://www.xxx.co.jp/dbc.dtd">
<head>
<titleData DATA SHOPPING</title>

<script language="JavaScript">
var enableToFitting = false;

function initialize(){
  var enableToFitting = Browser.GetBrowserSupport("fitting")      } G
  a=document.getElementById("btn_3");
  if( enableToFitting==true){
    a.style.visibility="visible";
  } else {
    a.style.visibility="hidden";
  }                                                                } H
  var scrn_height = Browser.GetScreenInfo("height");
  document.all.div_live.style
    = "position:absolute; top:60; left:40; width:1536; height:864 visibility:visible;"   } F
  document.all.div_btn1.style
    = "position:absolute; top:60; left:1616; width:264; height:162 visibility:visible;"
  document.all.div_btn2.style
    = "position:absolute; top:316; left:1616; width:264; height:162 visibility:visible;"
  document.all.div_btn3.style
    = "position:absolute; top:572; left:1616; width:264; height:162;"
  document.all.div_btn4.style
    = "position:absolute; top:828; left:1616; width:264; height:162 visibility:visible;"
  if ( scrn_hight == 480) {
    document.all.div_live.style.width = 336;
    document.all.div_live.height = 189;

    document.all.div_btn1.left = 416;
    document.all.div_btn1.height = 70;
    document.all.div_btn2.top = 150;
    document.all.div_btn2.left = 416;
    document.all.div_btn2.height = 70;
    document.all.div_btn3.top = 240;
    document.all.div_btn3.left = 416;
    document.all.div_btn3.height = 70;
    document.all.div_btn4.top = 310;
    document.all.div_btn4.left = 416;
    document.all.div_btn4.height = 70;
```

FIG. 20

```
  }
}
</script>
</head>

<body onLoad="initialize()">
<div style="position:absolute; font-size:24; top:20; left:40; width:180; height:40; visibility:visible;">
ふんわりセーター
</div>
<div id = "div_live">
 <object id="live",type="video/mpeg2" data="00"></object>       } A
</div>
<div id = "div_btn1">
 <a href="spec.htm">
 <object id="btn1",type="image/jpeg" data="btn_spec.jpg"></object>      } B
 </a>
</div>
<div id = "div_btn2">
 <a href="imagall.htm">
 <object id="btn2",type="image/jpeg" data="btn_imgall.jpg"></object>    } C
 </a>
</div>
<div id = "div_btn3">
 <a href="fitting.htm">
 <object id="btn3",type="image/jpeg" data="btn_fitting.jpg"></object>   } D
 </a>
</div>
<div id = "div_btn4">
 <a href="order.htm">
 <object id="btn4",type="image/jpeg" data="btn_order.jpg"></object>     } E
 </a>
</div>
</body>
```

FIG. 24

```
<!DOCTYPE dbc SYSTEM "http://www.xxx.co.jp/dbc.dtd">
<head>
<titleData DATA FITTING</title>

<script language="JavaScript">
var scrn_height, scrn_width, scrn_ratio, scrn_scale;
var smpl_width, smpl_height, smpl_scale;
var smpl_guidex, smpl_guidey, smpl_left, smpl_top;
var usr_source, usr_height, usr_width, usr_scale, usr_guidex;
var usr_guidex, usr_guidey, usr_left, usr_top;
var enableToFitting, kx, ky, offsetx, offsety;

function initialize() {
        var enableToFitting = Browser.getBrowserSupport("fitting");
        if ( enableToFitting == TRUE ) {
                getScreenInformation();

                getSampleInformation();
                getUserInformation();

                adjustCompositSize();
                setSampleInformation();
                setUserInformation();
        }
}

function getScreenInformation() {                              ┐
        scrn_height = Browser.GetScreenInfo("height");          │
        scrn_width = browser.GetScreenInfo("width");            │
        scrn_ratio = Browser.GetScreenInfo("ratio");            │
        scrn_scale = Browser.GetScreenInfo("scale");            │
        if (scrn_height == 1080) {                              │
                kx = 1.00;                                      │
                ky = 1.00;                                      │
        } else {                                                ├A
                if (scrn_ratio == 1) {                          │
                        kx = 0.375;                             │
                        ky = 0.444;                             │
                } else {                                        │
                        kx = 0.375;                             │
                        ky = 0.333;                             │
                }                                               │
        }                                                       │
}                                                               ┘

function getSampleInformation() {                              ┐
        smpl_width = 1024;                                      │
        smpl_height = 768;                                      │
        smpl_scale = xxxx;                                      ├B
        smpl_guidex = 400;                                      │
        smpl_guidey = 150;                                      │
        if ( scrn_height == 480) {                              ┘
```

FIG. 25

```
                    sampl_width = smplwidth kx;
                    smpl_height = smpl_height ky;
                    smpl_guidex = smpl_guidex kx           B
                    smpl_guidey = smpl_guidey ky;
                    smpl_scale = smpl_scale*ky;
          }
}

function getUserInformation() {
          usr_source = Browser.GetUserInfo("face");
          usr_scale = document.all.usr_source.style.scale* ky;
          var factor = smpl_scale/usr_scale;

          usr_height = document.all.usr_source.style.height* ky*factor;    C
          usr_width = document.all.usr_source.style.width* kx factor;
          usr_guidex = document.all.usr_source.style.guidex* kx* factor;
          usr_guidey = document.all.usr_source.style.guidey* ky* factor;
}

function resizeSampleInformation( var f ) {
          smpl_width = smpl_width* f;
          smpl_height = smpl_height* f ;
          smpl_guidex = smpl_guidex*f;
          smpl_guidey = smpl_guidey*f ;
}

function resizeUserInformation( var f ) {
          usr_width = usr_width*f;
          usr_height = usr_height* f ;
          usr_guidex = usr_guidex*f;
          usr_guidey = usr_guidey*f ;
}
```

FIG. 26

```
function adjustCompositionSize() {
        var compsite_width, remainx, factorx;
        var compsite_height, remainy, factory;
        var resize;

        compsite_width = 0;
        offsetx = smpl_guidex - usr_guidex;
        if ( offsetx < 0 )
                composite_width = composite_width - offsetx;
        } else {
                offsetx = 0;
        }
        remainx = offsetx + usr_width - smpl_width;
        if ( remainx < 0 ) {
                compsit_width = comosite_width - remainx;
        }
        factorx = smpl_width/(compsite_width + smpl_width);

        compsite_height = 0;
        offsety = smpl_guidey - usr_guidey;
        if ( offsety < 0 ) {
                composite_height = composite_hight - offsety;
        } else {
                offsety = 0;
        }
        remainy = offsety + usr_height - smpl_height;
        if ( remainy < 0 ) {
                compsit_height = comosite_height - remainy;
        }
        factory = smpl_height/(compsite_height smpl_height);

        if ( factorx < 1 )
                resize = factorx;
        else {
```

```
                    resizeUserInformation( resize );
                    offsetx = (0 - offsetx)*resize;          D
                    offsety = (0 - offsety)*resize;
          }
}

function setSampleInformation() {
          document.all.sampleDiv.style.width = smpl_width;
          document.all.sampleDiv.style.height = smpl_height;        E
          document.all.sampleDiv.style.top = smpl_top + offsety;
          document.all.sampleDiv.style.left = smpl_left + offsetx;
}

function setUserInformation() {
          document.all.UserDiv.style.width = usr_width;
          document.all.UserDiv.style.height = usr_height;                              F
          document.all.UserDiv.style.top = smpl_top + smpl_guidey - usr_guidey;
          document.all.UserDiv.style.left = smpl_left + smpl_guidex - usr_guidex;
}

function setLiveInformation() {
 if ( scrn_height = 1080 ) {
  document.all.LiveDiv.style
   = style="position:absolute; top:20; left:1088; width:752 height:432 visibility:visible;"
 } else {
  if( ratio == 1 ) {
   document.all.LiveDiv.style
    = style="position:absolute; top:20; left:428; width:282 height:192 visibility:visible;"
  } else {
   document.all.LiveDiv.style
    = style="position:absolute; top:20; left:428; width:282 height:144 visibility:visible;"
  }
 }
}
```

FIG. 28

```
function setButtonInformation() {
 if ( scrn_hight = 1080 ) {
  document.all.div_btn_up.style
   = "position:absolute; top:472; left:1288; width:250 height:200 visibility:visible;"
  document.all.div_btn_left.style
   = "position:absolute; top:547; left:1088; width:200 height:250 visibility:visible;"
  document.all.div_btn_down.style
   = "position:absolute; top:672; left:1288; width:250 height:200 visibility:visible;"
  document.all.div_btn_right.style
   = "position:absolute; top:547; left:1538; width:200 height:250 visibility:visible;"
  document.all.div_btnback2.style
   = "position:absolute; top:892; left:1281; width:264 height:162 visibility:visible;"
 } else {
  document.all.div_btn_up.style
   = "position:absolute; top:220; left:520; width:100 height:80 visibility:visible;"
  document.all.div_btn_left.style
   = "position:absolute; top:260; left:440; width:80 height:100 visibility:visible;"
  document.all.div_btn_down.style
   = "position:absolute; top:320; left:520; width:100 height:80 visibility:visible;"
  document.all.div_btn_right.style
   = "position:absolute; top:260; left:620; width:80 height:100 visibility:visible;"
  document.all.div_btnback2.style
   = "position:absolute; top:410; left:520; width:100 height:60 visibility:visible;"
 }
}

function move_up() {
        var top = UserDiv.style.top - 10;
        if (top < 60) {
                top = 60;
        }
        document.all.UserDiv.style.top = top;
}

function move_down() {
        var top = UserDiv.style.top + 10;
```

FIG. 29

```
        var limit = 60 + document.all.SampleDiv.style.height;
        if (top > limit) {
                top = limit;
        }
        document.all.UserDiv.style.top = top;
}

function move_left() {
        var left = UserDiv.style.left - 10;
        if (top < 40) {
                top = 40;
        }
        document.all.UserDiv.style.left = top;
}

function move_right() {
        var left = UserDiv.style.left + 10;
        var limit = 40 + document.all.SampleDiv.style.width;
        if (left > limit) {
                left = limit;
        }
        document.all.UserDiv.style.left = left;
}


</script>
```

FIG. 30

```
</head>

<body onLoad="initialize()">

<div id="sampleDiv" style="position:absolute; visibility:visible;">
        <object id="sampleImg",type="image/jpeg"></object>
</div>
<div id="UserDiv" style="position:absolute; visibility:visible;">
        <object id="usr_source",type="image/jpeg"></object>
</div>

<div id="LiveDiv">
        <object id="Live",type="video/mpeg2" data="00"></object>
</div>

<div id="div_move_up">
        <a onSelect="move_up()">
        <object id="btn_up",type="image/jpeg" data="btn_up.jpg"></object>
        </a>
</div>
<div id="div_move_left">
        <a onSelect="move_left()">
        <object id="btn_left",type="image/jpeg" data="btn_left.jpg"></object>
        </a>
</div>
<div id="div_btn_down">
        <a onSelect="move_down()">
        <object id="btn_down",type="image/jpeg" data="btn_down.jpg"></object>
        </a>
</div>
<div id="div_btn_right">
        <a onSelect="move_right()">
        <object id="btn_right",type="image/jpeg" data="btn_right.jpg"></object>
        </a>
</div>

<div id="div_btnback2">
        <a href="startup.htm">
        <object id="btnback2",type="image/jpeg" data="btn_back.jpg"></object>
        </a>
</div>
</body>
```

APPARATUS FOR RECEIVING BROADCAST DATA, METHOD FOR DISPLAYING BROADCAST PROGRAM, AND COMPUTER PROGRAM

BACKGROUND OF THE INVENTION

1. Field of the Invention

The present invention relates to a display control technique of data broadcast content in which characters, image, voice, video are multiplexed.

2. Description of the Related Art

As digital satellite broadcasting service has started, data-broadcasting service is received by not only personal computers but also television receivers. With the television receiver having a receiving function of receiving data broadcast data and a replay software program (a data broadcast browser), even a user who has no personal computer views a variety of pieces of information and displays texts and images, associated with a television program, on the screen of the television receiver. Standards controlling such a service is Standard ARIB-STD-B24 formulated by the Association of Radio Industries and Business (ARIB) in Japan.

TV stations encodes ordinary TV program data, audio data, and data broadcasting data. After being multiplexed, these pieces of data are modulated and then transmitted from an antenna. A signal transmitted from the antenna is then delivered to a user terminal (a television receiver) through a broadcasting satellite (BS).

FIG. 17 is a block diagram showing the construction of a typical receiver for receiving typical digital satellite broadcast signals. The Standard of the ARIB permits the resolution of a video plane 107, still image plane 108, and character and drawing image plane 109 to be different from receiver to receiver. For example, the still image plane 108 may have two types of resolutions, namely, a resolution of 1920 pixels (horizontally) by 1080 lines (vertically), and a resolution of 720 pixels (horizontally) by 480 lines (vertically). With the still image plane 108 of a resolution of 720×480, an aspect ratio of width frame to height frame may be 16:9 or 4:3 on a display.

With the still image plane 108 of a resolution of 1920×1080, each pixel on the still image plane 108 is displayed as a square. But with a resolution of 720×480, each pixel of the still image plane 108 has a slightly horizontally elongated rectangular shape if the aspect ratio of the display is 16:9, and has a slightly vertically elongated rectangular shape if the aspect ratio of the display is 4:3. The display is available in a variety of sizes, for example, 14 inches, 19 inches, and 33 inches.

Digital data is repeatedly transmitted from TV stations in the data carousel method standardized in ISO/IEC13818-6. Digital data, filtered by a transport decoder, contains text information, script information, image information, and video and audio data. Text information is described using XML (extensible Markup Language) regulated by the Worldwide Web Consortium (W3C).

Attempts to provide services such as electronic shopping using data broadcasting have been made. For example, when a television-shopping program is in progress, detailed information about goods is delivered using data broadcasting. A user operates the television receiver to monitor the detailed information about a commercial product currently being introduced during the program.

In the electronic shopping using the television receiver, the size of the displayed image of each commodity becomes different depending on the size of a TV screen in use and the resolution of the TV. The real size of each commodity and the size of the commodity which users feel according to the displayed image fail to match each other.

Japanese Laid-Open Patent No. 9-006944 discloses an electronic catalog system to reproduce the size of the commodity. According to the disclosure, the electronic catalog system scales the image of a product in accordance with the size of a display screen to present the image of the product in the real size thereof.

As described above, however, the receiving environment such as the resolution of the still image plane 108 of the TV receiver, the size of the display, and the aspect ratio of the display screen during presentation may be different from user to user.

The technique, disclosed in the above-cited Japanese Laid-Open Patent No. 9-006944, simply performs a scaling process taking into consideration the screen size only. The aspect ratio of an original product may change depending on the specifications of a TV receiver of a user. This technique is unable to present a product in its real size, and thus it is difficult to cause the impression of the product on the TV display screen to the user to match the actual impression of the product.

In accordance with the cited disclosure, the user needs to input data of the screen size, and the image data of the product in the real size thereof is generated from particular image data. Depending on a combination of the size of a product, display screen size, and resolution, the image quality of the image of the product is substantially degraded during real-size presentation. On-screen realism of the product is thus damaged.

For example, if a product as large as 1 meter high is displayed on a 14-inch TV monitor in the real size thereof as shown in FIG. 18A, a portion of the product is conventionally displayed in enlargement. The image quality is thus degraded.

In the example shown in FIGS. 18A and 18B, the image of a "bicycle" as long as 1.5 m is presented in the real size thereof on a 14-inch size TV screen. A portion of the image shown in FIG. 18A is thus presented as shown in FIG. 18B. If the resolution of the image shown in FIG. 18A is not high enough, image quality substantially decreases as shown in FIG. 18B. Realism of the bicycle is lost.

SUMMARY OF THE INVENTION

It is an object of the present invention to provide an apparatus, method and computer program for displaying an image of an object in a shape reflecting the size of the original object from image data transmitted through data broadcasting, regardless of the specifications of a receiver.

In an aspect, the present invention relates to an apparatus for receiving broadcast data, and includes a receiver for receiving image data of the image of an object and size information relating to the object, transmitted through data broadcasting, an input unit for inputting screen information relating to a display screen of display, a scaling unit for determining a scale factor of the object image based on the screen information input by the input unit and the size information received by the receiver so that the object image is displayed on the display at a predetermined size, and a display control unit for controlling the display to display the object image expanded or contracted at the scale factor determined by the scaling unit.

Further objects, features, and advantages of the present invention will be apparent from the following description of the preferred embodiments with reference to the attached drawings.

BRIEF DESCRIPTION OF THE DRAWINGS

FIG. 4 shows an example of XML data for startup screen in accordance with a first embodiment of the present invention.

FIG. 9 shows an example of XML data of a real-size display screen.

FIG. 10 is a continuation of the XML data of FIG. 9.

FIG. 14 is a flow diagram showing, in detail, a moving image window adjustment process of FIG. 11.

FIG. 19 shows XML data of a startup screen in accordance with a second embodiment of the present invention.

FIG. 20 is a continuation of the XML data of FIG. 19.

FIG. 24 shows XML data of a virtual fitting screen.

FIG. 25 is a continuation of the XML data of FIG. 24.

FIG. 26 is a continuation of the XML data of FIG. 25.

FIG. 27 is a continuation of the XML data of FIG. 26.

FIG. 28 is a continuation of the XML data of FIG. 27.

FIG. 29 is a continuation of the XML data of FIG. 28.

FIG. 30 is a continuation of the XML data of FIG. 29.

DESCRIPTION OF THE PREFERRED EMBODIMENTS

The embodiments of the present invention will now be discussed with reference to the drawings.

Figure 1:
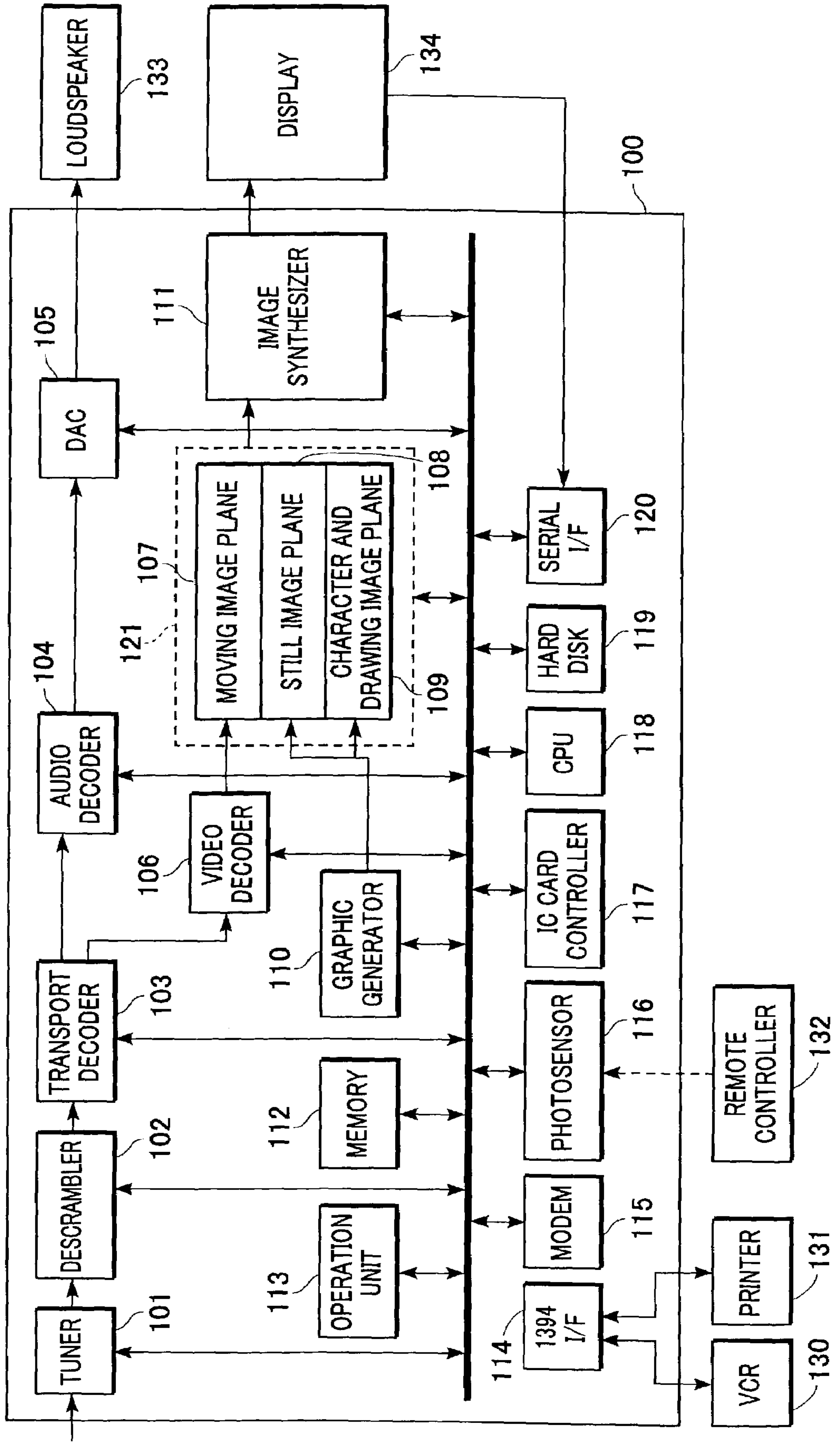
FIG. 1 is a block diagram showing the construction of a TV receiver incorporating the present invention.

FIG. 1 is a block diagram showing the construction of a digital TV receiver apparatus 100 incorporating the present invention.

Referring to FIG. 1, a signal received by an antenna is input to a tuner 101. The tuner 101 performs processes, such as demodulation and error correction, on the input signal, and reproduces digital data referred to as transport stream (TS). The reproduced transport stream (TS) data is output to a descrambler 102.

Upon receiving, from the tuner 101, the TS data that is scrambled to restrict viewing, the descrambler 102 descrambles the TS data based on key information contained in the TS data for descrambling and key information output from an IC card controller 117, and outputs descrambled TS data to a transport decoder 103.

The IC card controller 117 contains an IC card which stores user contract information and key information for decrypting the key information for descrambling contained in the TS data. When the key information for decrypting the key information for descrambling is present, the IC card controller 117 outputs the key information to the descrambler 102.

Upon receiving, from the tuner 101, the TS data not scrambled, the descrambler 102 outputs, the TS data to the transport decoder 103. The transport decoder 103 extracts a packet corresponding to a program selected by the user.

The video data in the extracted packet is decoded by a video decoder 106, and is then sent to a moving image plane 107 in a graphic buffer 121. The audio data in the extracted packet is decoded by an audio decoder 104, and is then output to a loudspeaker 133 through a D/A converter 105. Data broadcast data in the extracted packet is fed to a memory 112 through a bus 122 connected to a CPU 118. The data broadcast data, after being decoded by the CPU 118, is stored in a hard disk 119.

When the data broadcast data is displayed, the CPU 118 reads the data broadcast data stored in the hard disk 119, converts the data broadcast data into image data of characters and drawings using a graphic generator 110, and then sends the image data to one of character and drawing image plane 109 and still image plane 108 in the graphic buffer 121.

The character and drawing image plane 109 chiefly stores bit images such as buttons, texts, drawings, and pictures, serving as UI (user interface) in data broadcasting. The still image plane 108 stores bit images of photographs.

An image synthesizer 111 synthesizes and switches graphic data stored in each of the moving image plane 107, character and drawing image plane 109, and still image plane 108 in the graphic buffer 121, and outputs the resulting data to a display 134.

The display 134 displays the incoming image data. The display 134 has a memory storing information, such as a screen size of the display 134. Information stored in the memory is sent to the digital TV receiver apparatus 100 through a serial bus connected between the digital TV receiver apparatus 100 and display 134, and is thus sent to and stored in the memory 112 controlled by the CPU 118 through a serial interface 120 and bus 122.

Also connected to the bus 122 are an IEEE1394 interface 114 and a modem 115. The IEEE1394 interface 114 is used for the digital TV receiver apparatus 100 to perform protocol communication with an external VCR (Video Cassette Recorder) 130 and a printer 131. The modem 115 is used to be connected to the Internet through a telephone line.

Data Broadcasting

In the data broadcasting, digital data is repeatedly transmitted from TV stations in the DSM-CC data carousel method formulated in standard ISO/IEC13818-6. Digital data, filtered by the transport decoder 103, contains text information, script information, image information, and video and audio data. Text information is described using XML (extensible Markup Language) regulated by the W3C.

This embodiment employs specification based on XHTML specification which is standardized by reformulating HTML4.0 with XML1.0. In XML, a character sequence in a document is attributed to (defined by) a description between tag < > and tag </>. The tag may have a nested structure. The format is CSS (Cascading Style Sheet), and the script process uses Java (Trade Name) Script.

In this embodiment, the data broadcasting is linked with a shopping program. An object image captured from a product, being currently introduced in the shopping program, is multiplexed on the data broadcast data as a still image, and is then transmitted from a TV station. A plurality of types of object image data of a single product, such as a general image of the product, and an image that is obtained by enlarging a portion of the product to express texture of the product, are multiplexed to the data broadcast data.

Figure 2:
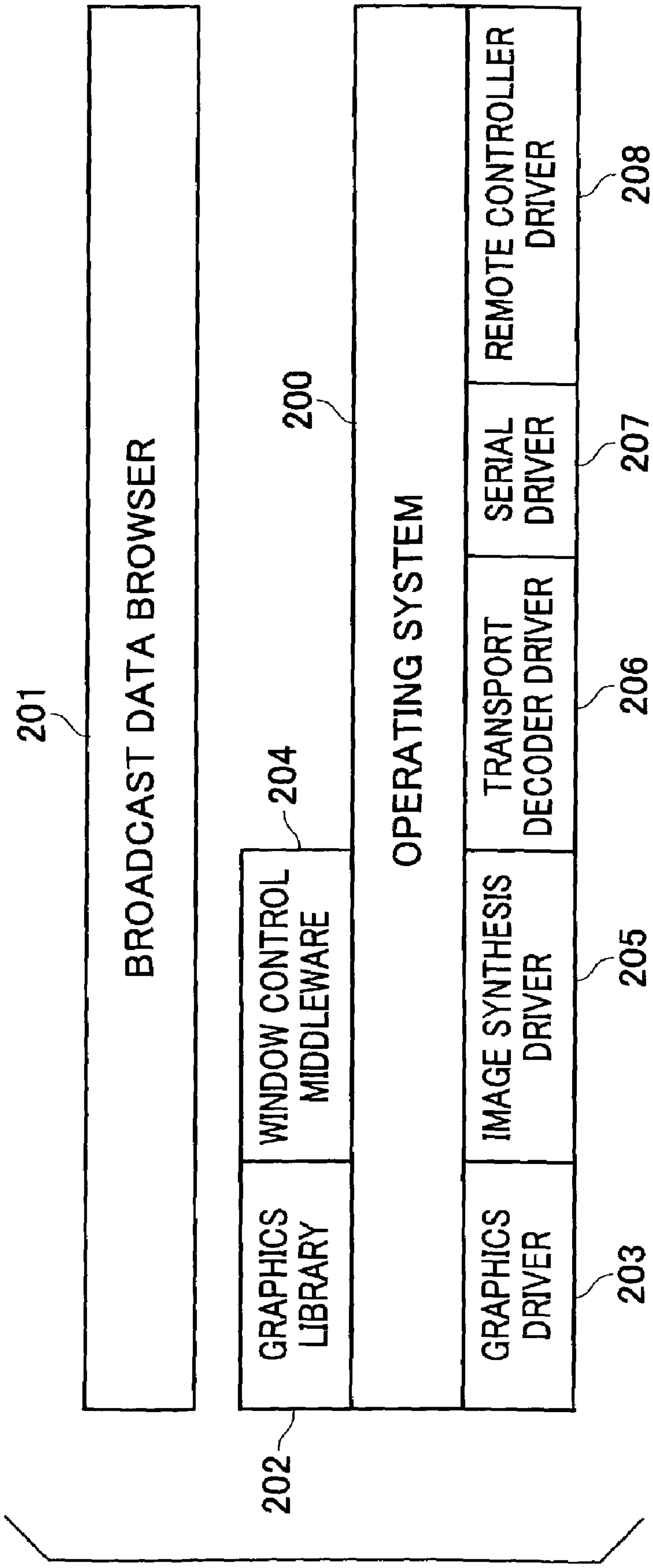
FIG. 2 shows a software configuration running on a CPU 118.

FIG. 2 shows a software configuration operating on the CPU 118. A data broadcasting browser 201 is an application running on an operating system 200. The data broadcasting browser 201 controls the graphic generator 110 using a graphics library 202 and graphics driver 203, thereby rendering characters, drawings, and image on the graphic buffer 121.

The data broadcasting browser 201 also controls the image synthesizer 111 using a window control middleware 204 and image synthesis driver 205, thereby synthesizing moving images, still images, characters, and drawings. The data broadcasting browser 201 controls the transport decoder 103 using a transport decoder driver 206, thereby performing filter setting on a moving image and voice to be reproduced, and receiving data broadcast data. The data broadcasting browser 201 further controls the serial interface 120 using a serial driver 207, thereby reading the screen size and aspect ratio of the display 134. The data broadcasting browser 201 communicates with a remote controller 132 through a remote controller driver 208, thereby receiving operational inputs from a user.

The operation of the digital TV receiver apparatus 100 thus constructed is discussed below.

Operation of Data Broadcasting Browser

Figure 3:
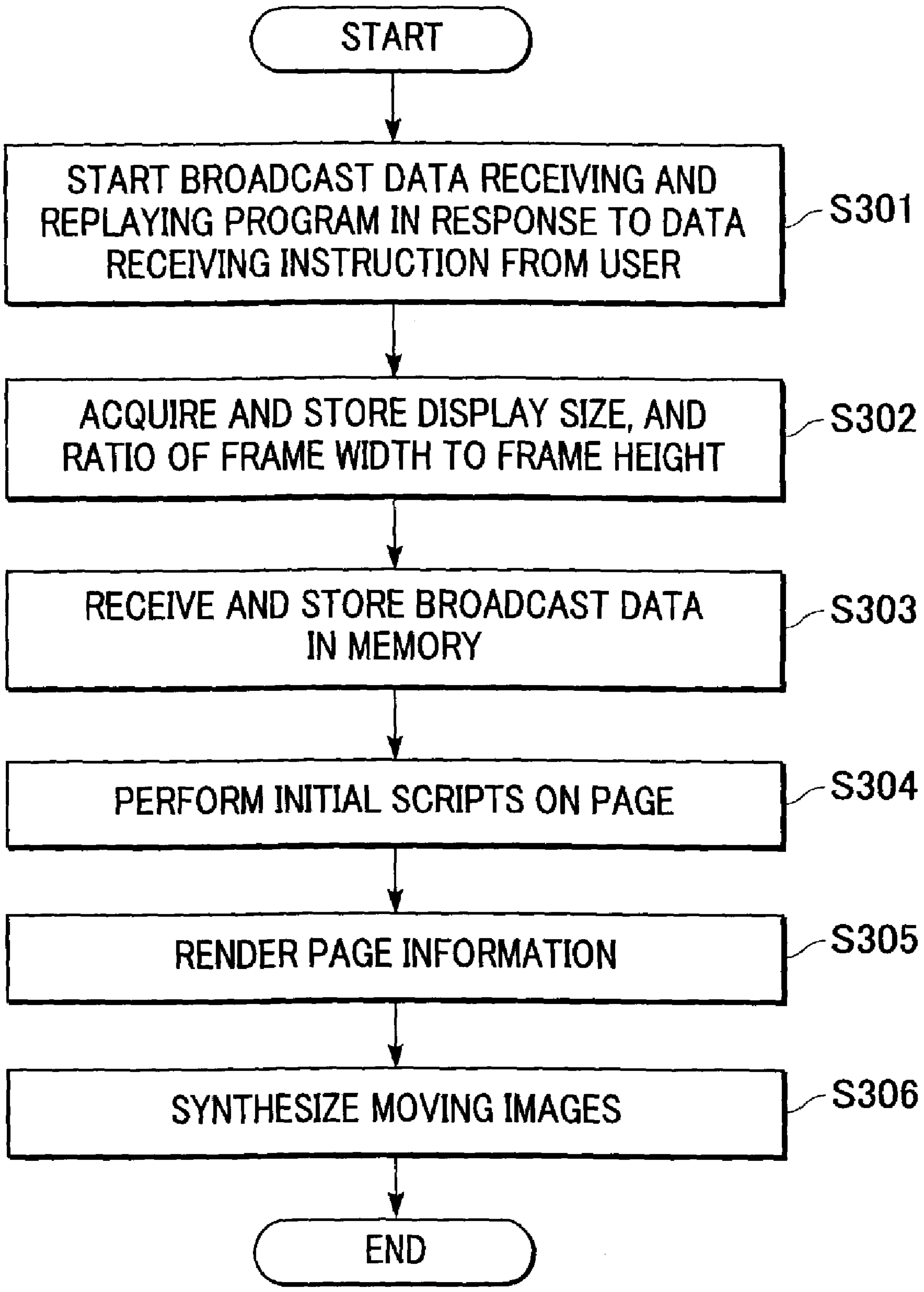
FIG. 3 is a flow diagram showing the content of a process of a data broadcasting browser.

FIG. 3 is a flow diagram showing the process of the data broadcasting browser 201. When the user requests the digital TV receiver apparatus 100 to present broadcast data using the remote controller 132 during viewing a TV program, the CPU 118 initiates a data broadcast receiving and replaying program (data broadcasting browser 201) in step S301.

The running data broadcasting browser 201 acquires size information of the screen and the aspect ratio from the display 134 (step S302). The digital TV receiver apparatus 100, connected to the display 134 through the serial bus, reads the screen size information and aspect ratio information stored in the memory of the display 134 through the serial bus. For example, information, such as "screen size=19.2 inches and aspect ratio=16:9", is thus acquired. The data broadcasting browser 201 stores the acquired information in the memory 112.

The data broadcasting browser 201 controls the transport decoder 103, thereby receiving data broadcast contents transmitted in the data carousel method. The data broadcasting browser 201 then acquires on-screen XML data and its associated data, such as an image, embedded in the XML data, and store these pieces of data in the memory 112 (step S303).

FIG. 4 shows an example of a startup screen of data broadcast XML data received by the digital TV receiver apparatus 100 and correspondingly associated with a shopping program. This example includes a component for <object> (object tag labeled (A) in FIG. 4) displaying a program on air, a component for a link button (labeled (B) in FIG. 4) displaying detailed information of a product currently introduced in the program, and components for link buttons (labeled (C), (D), and (E) in FIG. 4) for switching to a general view, texture view (enlarged view), real-size view, and order screen.

Each component is subject to style definition defining a display position and display format. For example, an object component labeled (A) in FIG. 4 is positioned within an area extending by a width of 1695 pixels from a position 40 pixels rightward from the left edge of the screen and a height of 856 pixels from a position 60 pixels down from the top of the screen. Each link button has a description of XML data which is displayed when the user presses the link button.

When an image associated with the XML data is acquired, the data broadcasting browser 201 executes a script function described in OnLoad attribute of <body> tag in the XML data, as an initial script (step S304 in FIG. 3). A script is described between <script> and </script> in FIG. 4, and initialize function is an initial script in this example.

Figure 5:
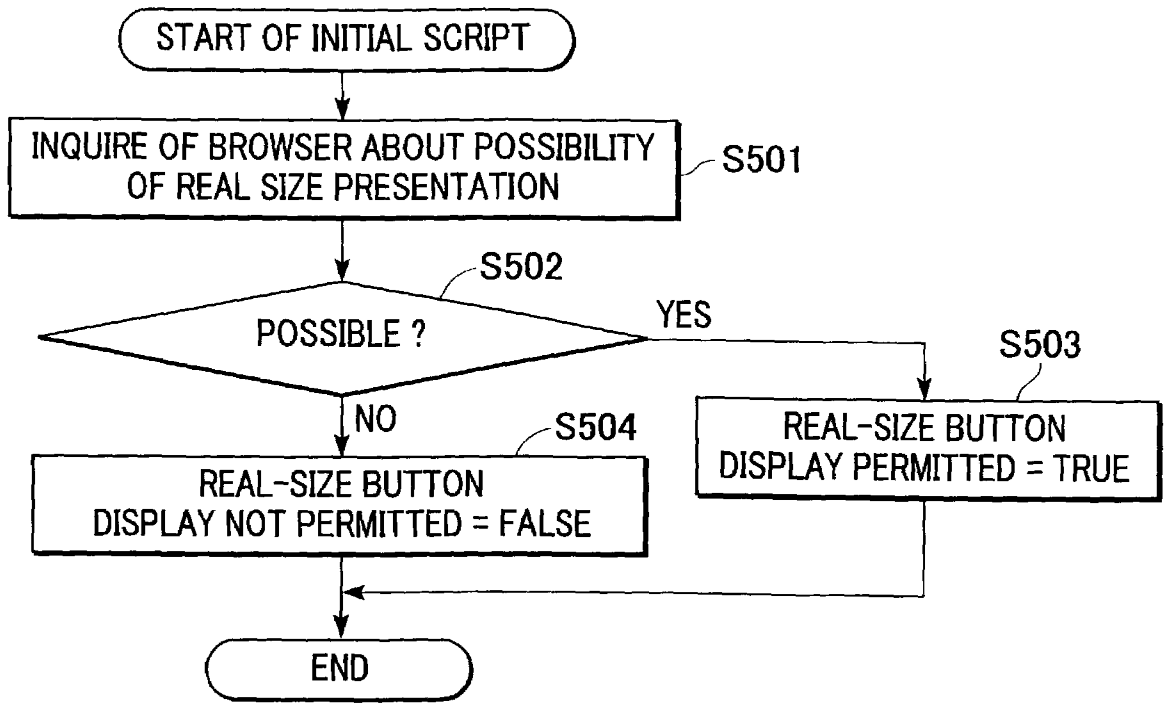
FIG. 5 is a flow diagram of an initial script process described in the XML data.

FIG. 5 is a flow diagram of the initial script process described in the startup screen XML data shown in FIG. 4.

In the initial script, a function is invoked to inquire of the current data broadcasting browser 201 about the working environment, in other words, to inquire whether the digital TV receiver apparatus 100 has a real-size presentation feature (step S501 in FIG. 5).

The data broadcasting browser 201 has GetBrowserSupport ( ) as a builtin API (ApplicationProgramInterface) which is invoked from the script. If a character sequence "realsize" as an argument is given, the API returns a value "1" (TRUE) or "0" (FALSE) as a variable representing display permission attribute.

Since the digital TV receiver apparatus 100 and the data broadcasting browser 201, now under discussion, have a real-size presentation feature, the return value of the API is TRUE (step S503 in FIG. 5). If this script is executed on the data broadcasting browser 201 having no real-size presentation feature, the return value of the API becomes FALSE (step S504 in FIG. 5).

In the above script, the return value of the API is substituted for a "visibility" attribute which decides whether or not to permit displaying of "a link button to real-size presentation". In other words, if the return value of the API is TRUE, "visible" is substituted for the visibility attribute to enable displaying the link button to the real-size presentation. If the return value of the API is FALSE, "hidden" is substituted for the visibility attribute to disable displaying the link button to the real-size presentation.

Subsequent to the execution of the initial script, the data broadcasting browser 201 renders the button image and text on the character and drawing image plane 109 using the graphic generator 110 (step S305 in FIG. 3). At the same time, the data broadcasting browser 201 controls the image synthesizer 111, thereby synthesizing the button image and text with an image in the moving image plane 107 (step S306 in FIG. 3).

Figure 6:
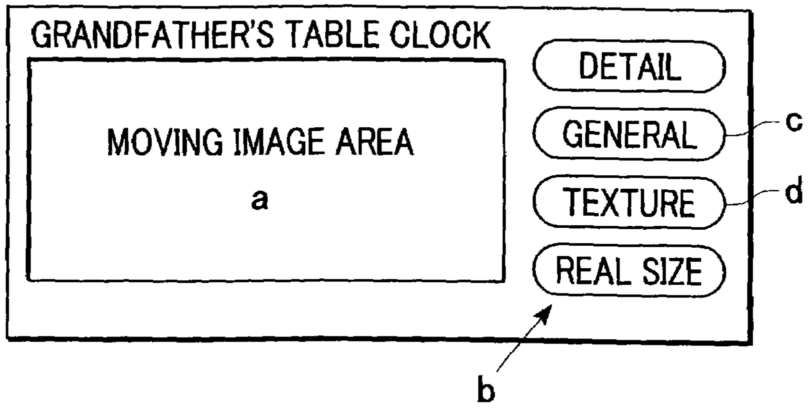
FIG. 6 shows a display screen which is generated by the data broadcasting browser from the XML data of the startup screen.

FIG. 6 shows a startup screen (main screen) which is generated by the data broadcasting browser 201 from the XML data. A rectangle labeled a is a moving image window where an image of the moving image plane 107, such as a video of TV shopping, which is normally displayed on the entire screen, is presented in a contracted form. On the remaining portion other than the moving image window, the data broadcasting browser 201, namely, the CPU 118 displays drawings and characters rendered on the character and drawing image plane 109 using the graphic generator 110. A link button b for the real-size presentation shown in FIG. 6 appears because the variable of the display permission attribute is TRUE.

General Presentation

When the user selects the general presentation button c on the main screen shown in FIG. 6 using the remote controller 132, general presentation display screen XML data is newly acquired, and the digital TV receiver apparatus 100 presents a screen based on the content of the XML data. The general presentation displays a still image of an entire product within the display screen. The data broadcasting browser 201 renders received still image file data onto the still image plane 108. The data broadcasting browser 201 also controls the image synthesizer 111, thereby presenting a screen formed of a moving image window for program presentation, a still image window for still image presentation, and a link button for returning to the main screen shown in FIG. 6.

Figure 7A:
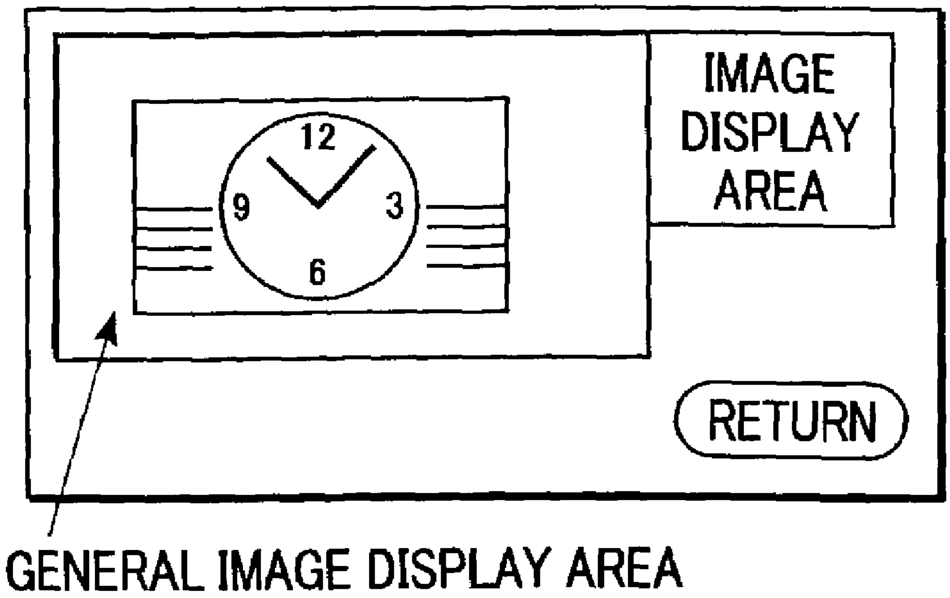
FIGS. 7A and 7B show display screens selected when a general display button is selected on the screen shown in FIG. 6.
Figure 7B:
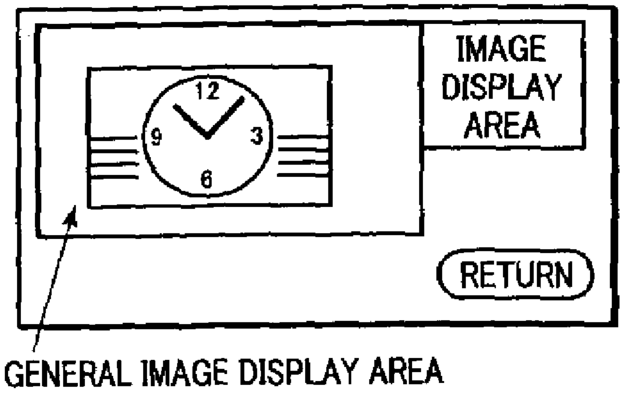

FIGS. 7A and 7B show display examples of the screen. FIG. 7A shows a display example presented on a display 134 having a diagonal size of 29 inches, and FIG. 7B shows a display example presented on a display 134 having a diagonal size of 19.2 inches.

Texture Presentation

Figure 8A:
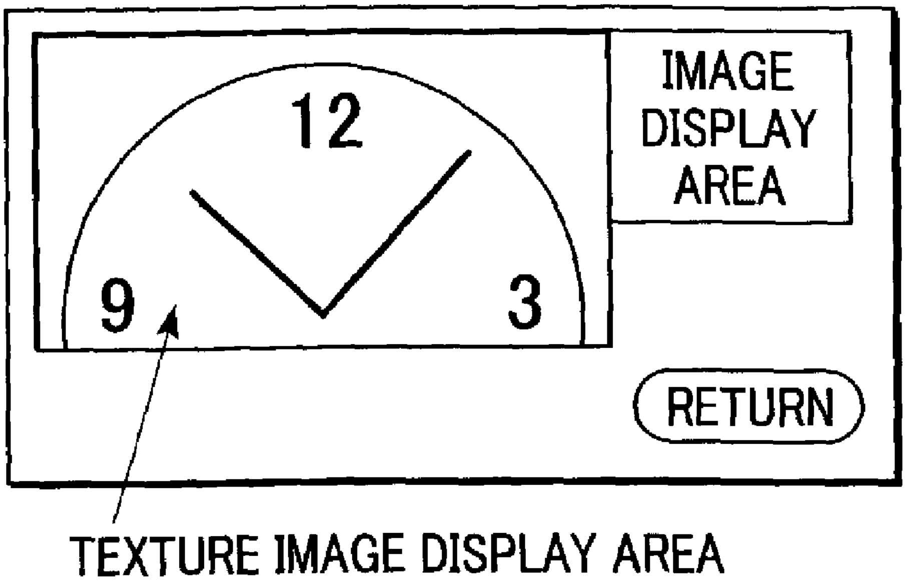
FIGS. 8A and 8B show display screens selected when a texture display button is selected on the screen shown in FIG. 6.
Figure 8B:
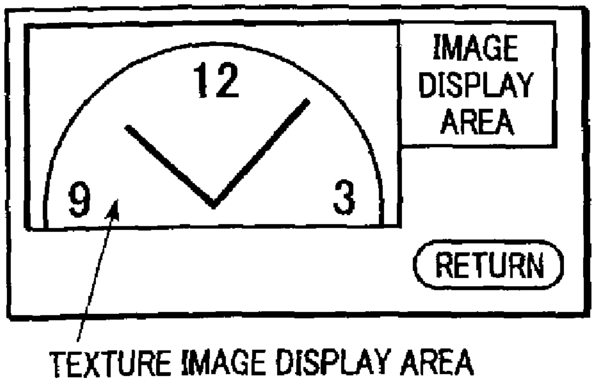

The user may select a texture presentation button d on the main screen shown in FIG. 6 using the remote controller 132, texture presentation display screen XML data is newly acquired, and the digital TV receiver apparatus 100 presents a screen based on the content of the XML data. FIGS. 8A and 8B show display examples of the screen. FIG. 8A shows a display example presented on a display 134 having a diagonal size of 29 inches, and FIG. 8B shows a display example presented on a display 134 having a diagonal size of 19.2 inches.

Unlike the general presentation screen, the texture presentation screen presents a still image which is captured within a close range to a product so that a texture of the product is seen. The data broadcasting browser 201 renders received still image file data to the still image plane 108. The data broadcasting browser 201 also controls the image synthesizer 111, thereby presenting a screen formed of a moving image window for program presentation, a still image window for still image presentation, and a link button for returning to the main screen shown in FIG. 6.

Real-size Presentation

When the user selects a real-size presentation button b on the main screen shown in FIG. 6 using the remote controller 132, XML data for the real-size presentation is newly acquired, and the digital TV receiver apparatus 100 presents a screen based on the content of the XML data. FIGS. 9 and 10 show the XML data.

Figure 11:
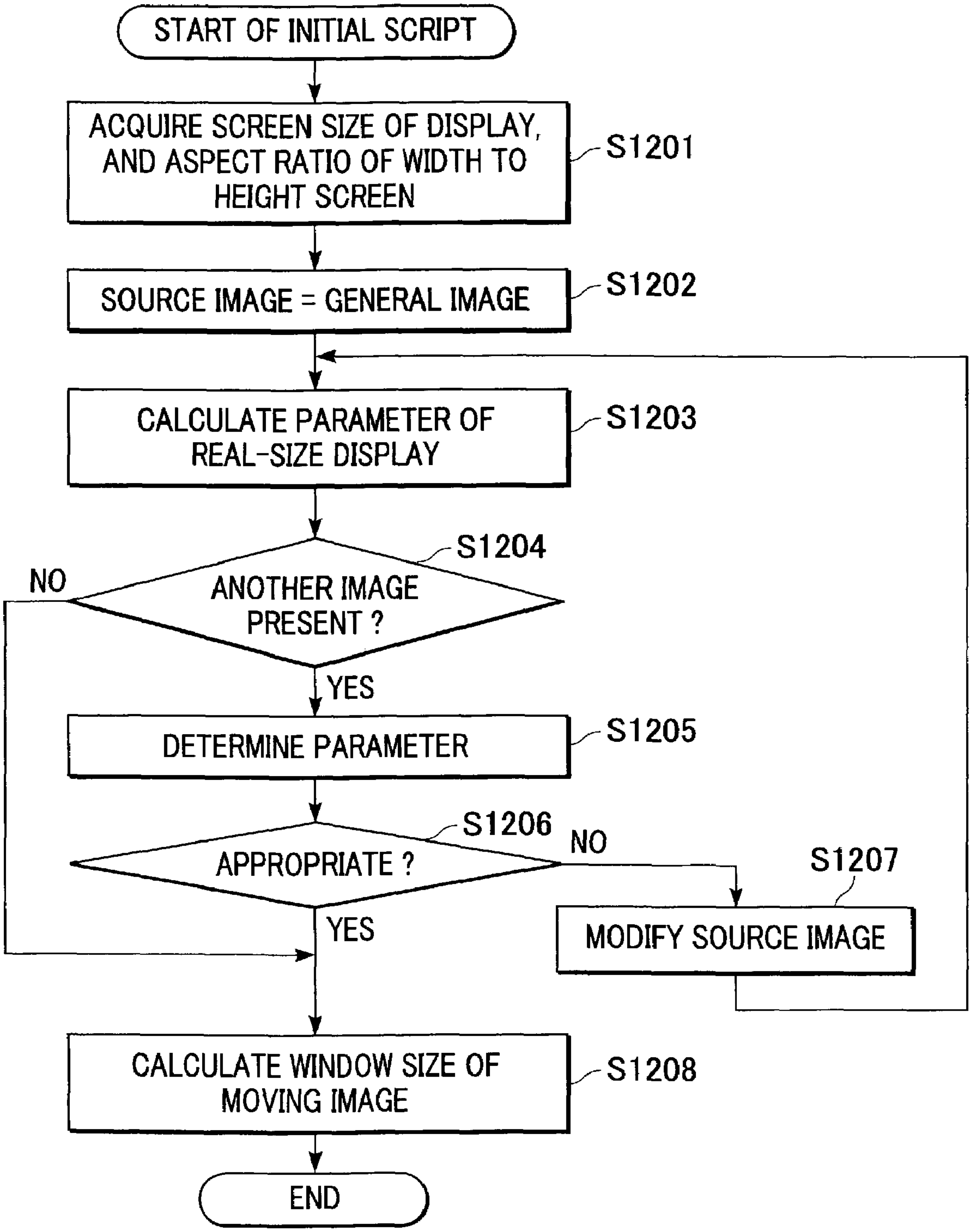
FIG. 11 is a flow diagram of an initial script process described in the XML data shown in FIGS. 9 and 10.

FIG. 11 is a flow diagram of an initial script process described in the XML data shown in FIGS. 9 and 10. The initial script is mainly carried out in first through fourth processes as described below.

In the first process, the screen information such as the display size and aspect ratio of the display 134 is acquired (step S1201).

In the second process, the real-size presentation parameter calculation process is carried out using the XML data and the general image of the product (steps S1202–S1203).

In the third process, an appropriate image determination process is carried out to determine whether an expansion rate and image size are appropriate (steps S1204–S1206). If it is determined that the image is not appropriate, the second step is carried out on another image (step S1207). If no other image is available, the algorithm proceeds to the fourth process.

In the fourth process, the size of the moving image window is determined taking into consideration the final window size for real-size image presentation (step S1208).

The first through fourth processes will be discussed in more detail.

The acquisition of the screen size and aspect ratio in the first process is performed by invoking GetScreenInfo ( ) as the API contained in the data broadcasting browser of the present invention from the script (see label (F) in FIG. 9).

If any of four type of character sequences "height", "width", "size", and "ratio" as an argument is designated, the API returns a return value responsive to the argument. The arguments height and width respectively represent the number of pixels in a horizontal direction and the number of pixels in a vertical direction in a maximum possible size of the still image plane 108 of the digital TV receiver apparatus 100. The argument size represents a diagonal size of the display 134 of the digital TV receiver apparatus 100. The argument ratio represents the aspect ratio of frame width to frame height of the display 134. Size "0" represents an aspect ratio of 4:3, and size "1" represents an aspect ratio of 16:9.

If a data broadcasting browser is displayed on the entire display screen of the digital TV receiver apparatus 100 of high-definition grade connected to the display 134 having a diagonal size of 19.2 inches and an aspect ratio of 16:9, the return values are height=1080, width=1920, size=19.2, and ratio=1. In the digital TV receiver apparatus 100 connected to the display 134 having a diagonal size of 14.6 inches and an aspect ratio of 4:3, the return values are height=480, width=720, size=14.6, and ratio=0.

When the script invokes the API, the data broadcasting browser 201 returns the values for size and ratio based on the information which has been stored in the memory 112 at a startup, and returns the values for height and width based on the resolution of the still image plane 108 of the digital TV receiver apparatus 100.

The real-size presentation is based on scaling information of a source image. A content producer of data broadcasting describes the already measured scaling information in the XML data. The script process of the data broadcasting browser 201 is thus simply to substitute values for variables src_height and src_width, and for variable src_dip which indicates the number of pixels per inch (see label (A) in FIG. 9).

Figure 12:
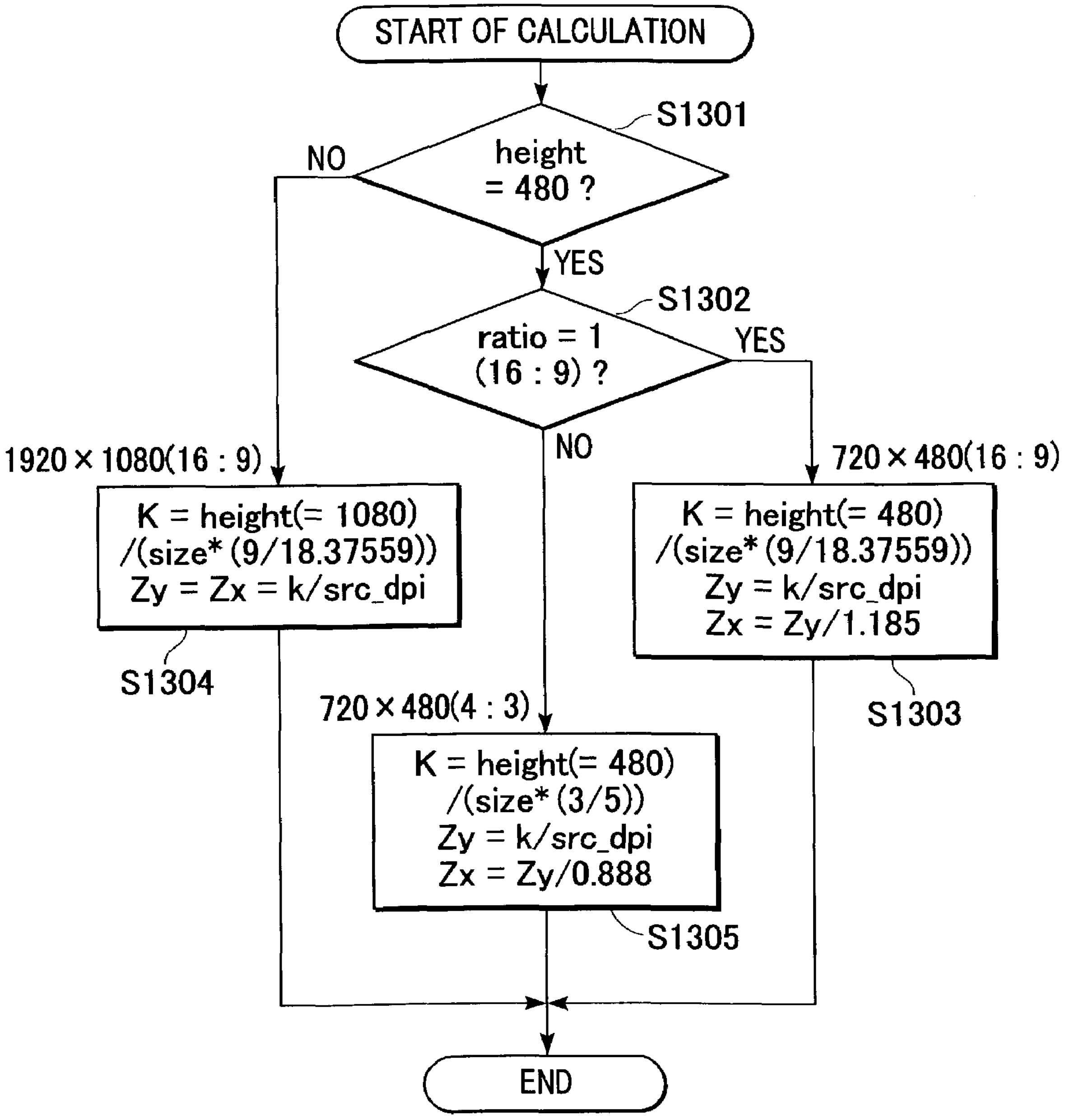
FIG. 12 is a flow diagram showing, in detail, a calculation process of a real-size display parameter of FIG. 11.

The second process of calculating the real-size presentation parameter is carried out as illustrated in a flow diagram in FIG. 12. The second process assumes three combinations of the resolution of the still image plane 108 of the digital TV receiver apparatus 100 and the aspect ratio of the display 134 (see label (G) in FIG. 9). The present invention is not limited to these combinations, and calculations corresponding to various combinations may be performed.

(1) Resolution of 1920×1080 and aspect ratio of 16:9

(2) Resolution of 720×480 and aspect ratio of 4:3

(3) Resolution of 720×480 and aspect ratio of 16:9

Referring to FIG. 12, height is the number of pixels in a height direction in the still image plane 108, ratio is an aspect ratio of the display 134 (16:9=1, 4:3=0), src_dpi is the number of pixels per inch in the source image, K is the number of pixels per inch in the display 134, Zx is a horizontal zoom ratio to be applied to the source image, and Zy is a vertical zoom ratio to be applied to the source image.

The value "18.37559" in the right side of the equation defining K represents a ratio of a diagonal line of the display 134 based on the aspect ratio (16:9) of the display 134, namely, $18.37559^2=16^2+9^2$. Similarly, the value "5" in the right side of another equation defining K represents a ratio of diagonal line of the display 134 based on the aspect ratio (4:3), namely, $5^2=4^2+3^2$.

In the combination (1), an image rendered on the still image plane 108 remains unchanged from that of the data broadcast data. The horizontal and vertical zoom ratios applied to the source image equal each other, namely, Zx=Zy (step S1304).

In the combination (2), an image rendered on the still image plane 108 has a shorter width than the source image in the data broadcast data, and the horizontal and vertical zoom ratios applied to the source image become different, namely, Zx>Zy (step S1305).

In the combination (3), an image rendered on the still image plane 108 has a longer width than the source image in the data broadcast data, and the horizontal and vertical zoom ratios applied to the source image become different, namely, Zx<Zy (step S1303).

Figure 13:
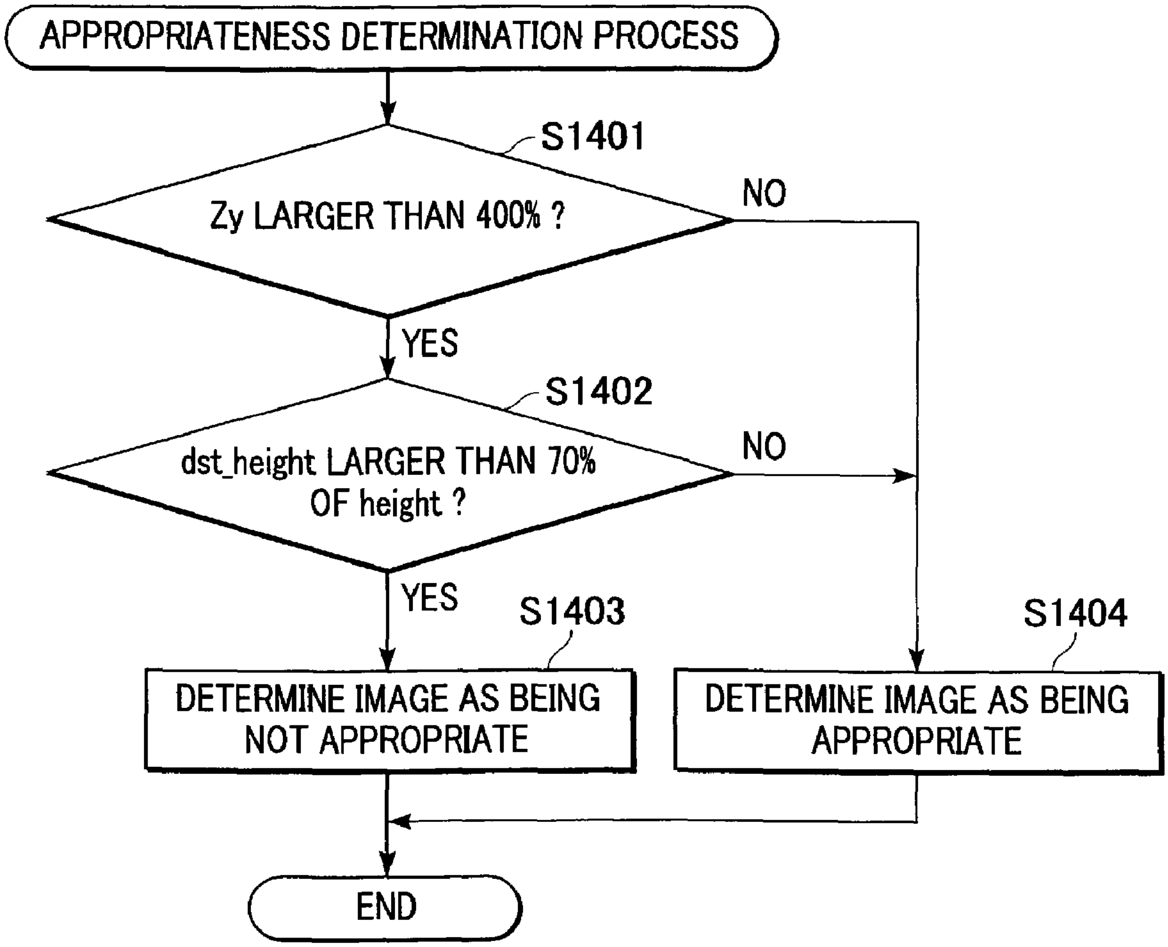
FIG. 13 is a flow diagram showing, in detail, an appropriateness determination process of FIG. 11.

The third process of determining an appropriate image is performed in accordance with the flow diagram shown in FIG. 13. As shown, dst_height is the number of pixels subsequent to an expansion process of the source image in the height direction, height is the number of pixels of the browser window in the height direction, and Zy is a vertical zoom ratio to be applied to the source image.

In the third process, the image is determined as being not appropriate (step S1403) if the zoom rate in the height direction calculated in the second process is larger than a predetermined value (step S1401) and if the image size is larger than a predetermined value subsequent to the zooming of the source image in accordance with the zoom rate (step S1402); otherwise, the image is determined as being appropriate (step S1404).

In this embodiment, the image is determined as being not appropriate if the vertical zoom ratio is 400% and if the number of pixels in a height direction subsequent to the zooming process of the source image at a zoom ratio of 400% is 70% or more of the number of pixels of the browser window in a height direction (see label (H) in FIG. 10).

Production of Texture Image from Real-Size Image

If the image is determined as being not appropriate in the third process, the source image is switched from the general image to an enlarged image (texture image), and the algorithm starts over again from the second process (step S1207 in FIG. 11).

The adjustment of the size of the moving image window in the fourth process is carried out in accordance with a flow diagram shown in FIG. 14 (see label (I) in FIG. 10).

As shown, dst_height is the number of pixels in a height direction subsequent to a zooming process of the source image, dst_width is the number of pixels in a width direction subsequent to the zooming process of the source image, height is the number of pixels of the browser window in a height direction, width is the number of pixels of the browser window in a width direction, real_height is the number of pixels of a real-size image display window in height direction, real_width is the number of pixels of the real-size image display window in a width direction, mov_height is the number of pixels of the moving window in a height direction, and mov_width is the number of pixels of moving window in a width direction.

In the adjustment of the moving image window size, an image size (dst_height and dst_width) is determined by zooming in (zooming out) the source image according to the zoom rate (Zx, Zy) determined in the third process. The real-size display presentation window size (real_height, real_width) and the moving image window size (mov_height, mov_width) are determined so that the image size falls within a constant percentage (70%, for example, as shown in FIG. 14) of the (browser window) screen (from step S1501 to step S1503).

Display Examples

Figure 15A:
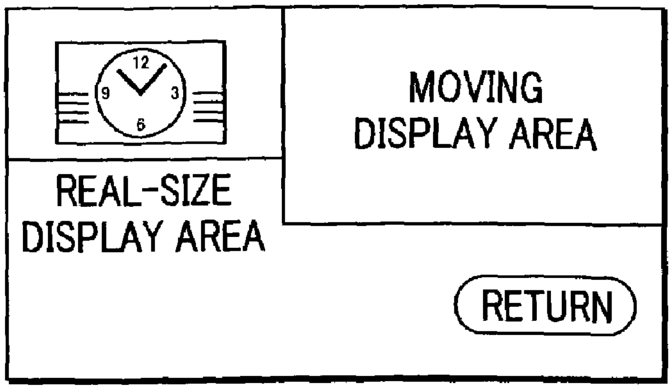
FIGS. 15A and 15B show an example of display screen which is generated by the data broadcasting browser from the XML data of the real-size screen.
Figure 15B:
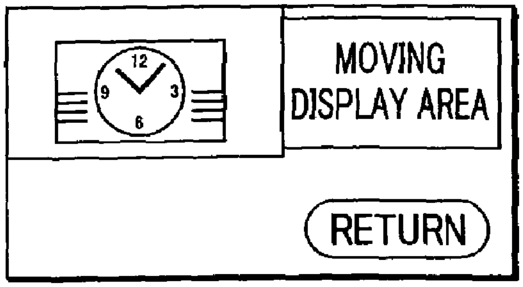

FIGS. 15A and 15B show display examples resulting from the process of the script described in the real-size display screen XML data. FIG. 15A shows a screen of the display 134 having a diagonal size of 29 inches and an aspect ratio of 16:9, and FIG. 15B shows a screen of the display 134 having a diagonal size of 19.2 inches and an aspect ratio of 16:9.

As seen from FIGS. 15A and 15B, the image of the product is maintained even if the display 134 changes the screen size thereof. Since the size of the moving image display window is adjusted to a maximum size in response to the window size of the real-size presentation, the TV is viewed under optimum environments.

Figure 16A:
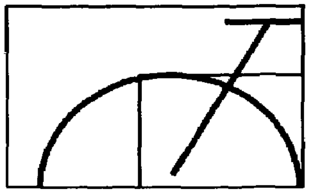
FIGS. 16A and 16B show examples of display screen which is generated by the data broadcasting browser from the XML data of the real-size screen.
Figure 16B:
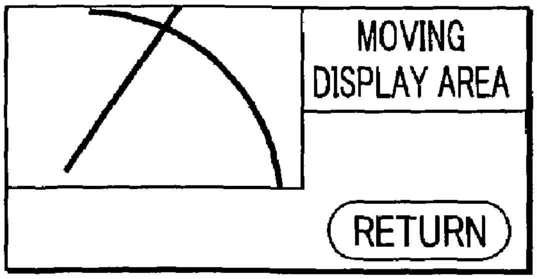
Figure 17:
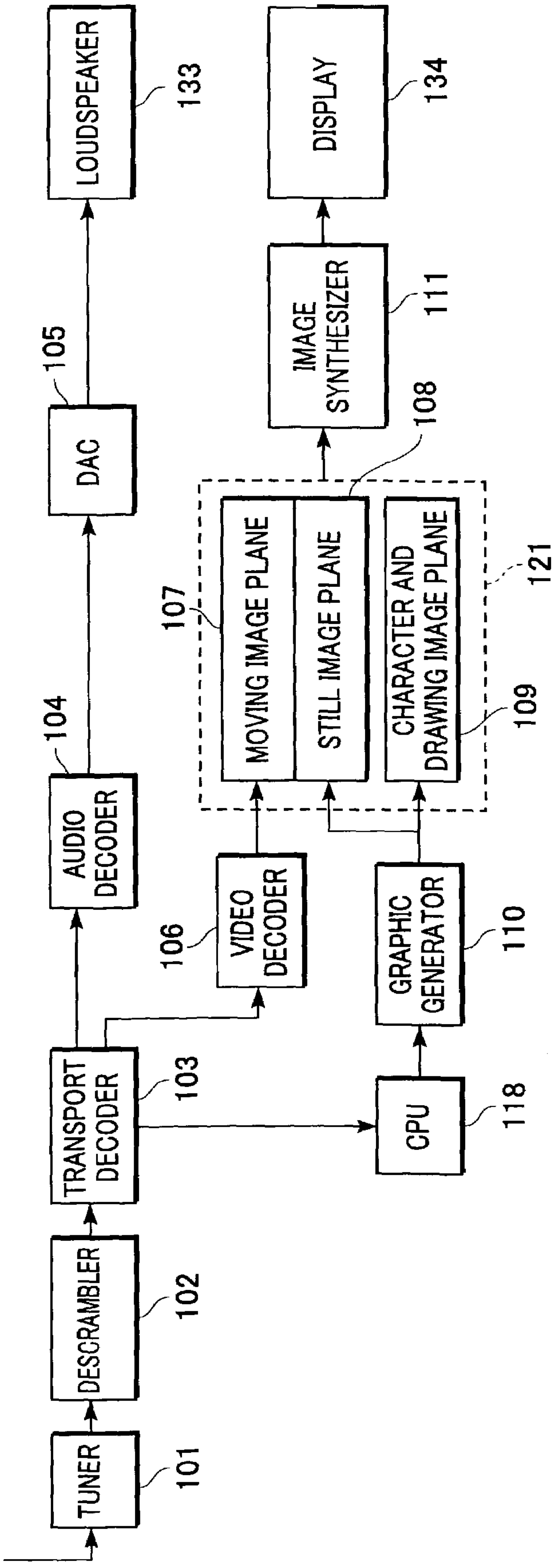
FIG. 17 is a block diagram showing the construction of a typical digital TV receiver.

FIGS. 16A and 16B show a 19-inch display on which an image of a commercial product having a length of 1 meter or longer, such as a bicycle, is presented. The data broadcasting browser 201 of this embodiment generates an image of interest of the product of this size, namely, a real-size image as an enlarged (texture) source image, as shown in FIG. 16A rather than a general image shown in FIG. 18A. Image quality of the real-size image is thus better than the one resulting from the source image shown in FIG. 18A.

In accordance with this embodiment, realism felt by the user is improved because the image processing apparatus that receives data broadcast data presents the image of a product or commodity at the real size thereof during viewing a TV shopping program. User confidence in the data broadcast TV shopping is thus promoted.

This embodiment allows the image of an object to be displayed at the real-size regardless of specifications of the display presenting the data broadcast program, such as the screen size and resolution.

In accordance with this embodiment, a real-size presentation content is replayed only when a receiver having a real size presentation feature receives a single data broadcasting content.

Since window sizes in a concurrent display of a TV video and a product in the program associated data broadcasting are optimized, product presentation is carried out with the screen efficiently utilized.

The image quality of the real-size image is improved, and real-size presentation is performed without the need for particular user setting.

This embodiment has been discussed in connection with the "data broadcast shopping" as a content of the data broadcasting. The data broadcasting content is not limited to this. The data broadcasting content may be the image of any object as long as the viewer wants to know the size of the object. For example, in a data broadcasting associated with an educational program, the content may be the image of animals or insects.

The image data for presenting a real-size image is not only still image data but also moving image data in which commercial products, mounted on a table, turn integrally with the table, for example. The moving image data of the commercial products may be transmitted using PES (PacketizedElementaryStream) as a data stream method.

The process steps for zooming the image data may be stored beforehand in the receiver rather than being contained in the transport stream transmitted in the data broadcasting. In this case, a data broadcasting apparatus simply transmits a reference display size of the image data, and is freed from the responsibility to transmit parameters for expansion and contraction in accordance with the receiver. The data broadcasting apparatus thus allows receivers having a variety of specifications to display a real-size image. The present invention finds widespread use.

In the electronic shopping using the TV receiver, users are unable to actually pick up and touch a product. Users are unable to try a dress on before purchasing it, for example, and cannot correctly picture to themselves in the dress.

To overcome such a drawback, virtual fitting may be contemplated by synthesizing image data representing the user's own image and image data of a commercial product on a display.

There are a variety of TV receiver types with display screens thereof varied in size and resolution available for virtual fitting. The aspect ratio of a displayed image of commercial product is different from TV receiver to TV receiver. The size of the image of the product conveyed to the user may fail to match the actual size of the product.

A plurality of broadcasters present a diversity of commodities in their programs. The products are substantially different in size, and the product images cannot be synthesized with the user image.

Electronic fitting or virtual fitting using broadcasting, communication, or separate storage media has been proposed. For example, according to Japanese Laid-Open Patent No. 5-336445 has proposed an image processing method which synthesizes and displays a commercial product image based on a posture and size of a personal appearance image when the personal appearance image of a user and the commercial product image are synthesized.

When the image processing method is applied to virtual fitting in an electronic shopping based on the data broadcasting and the TV receiver, different types of the product image must be broadcast concurrently in parallel as long as there is a possibility of being used by any user. This occupies a substantial portion of available data capacity permitted for data broadcasting, thereby disabling the transmission of image data of numerous sorts of commercial products.

Japanese Laid-Open Patent No. 7-210608 has proposed a sales assisting system which contracts or expands, synthesizes and displays product image data by obtaining the size of a user image from the user image or from an input unit.

When such sales assisting system is applied to a virtual fitting in an electronic shopping that uses the data broadcasting and TV receiver, it is required to display a diversity of types of product image data provided by a plurality of broadcasters. If the actual product image is too large with respect to the size of the user image, the TV screen cannot accommodate the product image.

Since the resolution and aspect ratio of the TV screen presenting the product are not taken into consideration, the user may have the impression of the product from the TV screen, different from the actual product, if the aspect ratio of the shown product changes.

It is an object of the present invention to overcome this drawback. It is also another object of the present invention to synthesize a user image and an image derived from the data broadcast data in a correct scale regardless of specifications of receivers.

A second embodiment of the present invention will now be discussed in detail referring to the drawings. In accordance with the second embodiment, the digital TV receiver apparatus 100 uses a data broadcasting browser having a virtual fitting function, thereby synthesizing and displaying a user image and an image transmitted using data broadcasting in a correct scale.

The digital TV receiver apparatus 100 of the second embodiment remains unchanged from that shown in the block diagram in FIG. 1. The data broadcasting browser of the first embodiment has the real-size presentation function, while the data broadcasting browser of the second embodiment has a virtual fitting function. The discussion of the operation of the major portions of the digital TV receiver apparatus 100 is omitted here. The operation discussed below relates to the initiation of the data broadcasting browser based on the XML data transmitted using the data broadcasting and the virtual fitting.

Figure 22:
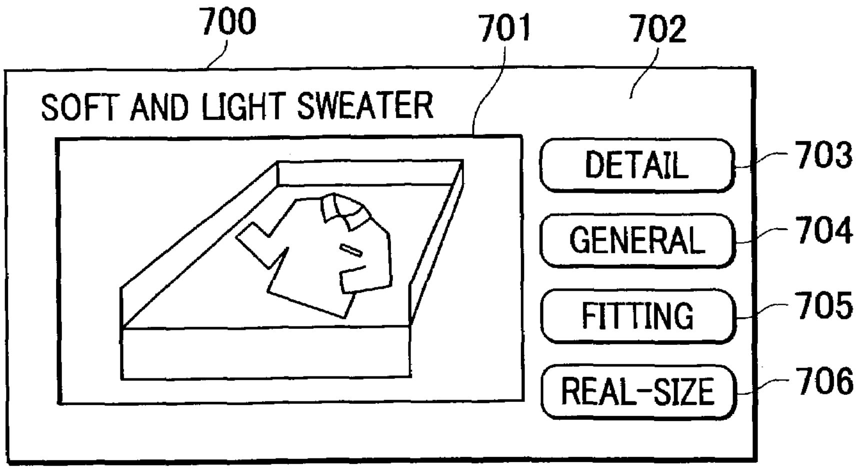
FIG. 22 shows a display screen which is generated by a data broadcasting browser from the XML data of a startup screen.

The CPU 118 in the digital TV receiver apparatus 100 operates in the same manner as already discussed with reference to FIG. 3 except the startup screen XML data in the execution of the initial script in step S304. As a result, the rendering process of the startup screen in steps S305 and S306 results in a startup screen (main screen) as shown in FIG. 22.

FIGS. 19 and 20 show an example of XML data of the startup screen of data broadcasting correspondingly associated with a shopping program. In this example, the XML data contains a component <object> (object tag, see label (A) in FIG. 20) for displaying a program on air, a link button (see label (B) in FIG. 20) for displaying detailed information of a product being introduced in a current program, and components (labeled (C), (D), and (E) in FIG. 20) for switching to a general view, texture view (enlarged view), real-size view, and order screen.

Each component is subject to style definition defining a display position and display format. For example, each component represents that a corresponding object is placed in an area at a position adjusted by the initial script in each display screen. Specifically, an object component labeled (A) in FIG. 20 is placed within an area extending by a width of 1536 pixels from a position 60 pixels down from the top of the screen, and by a height of 864 pixels from a position 40 pixels rightward from the left edge of the screen (see label (F) in FIG. 19). Each link button has a description of XML data which is displayed when the user presses the link button.

When an image associated with the XML data is acquired, the data broadcasting browser 201 executes a script function described in OnLoad attribute of <body> tag in the XML data, as an initial script (step S304 in FIG. 3).

A script is described between <script> and </script> in FIG. 19, and an initialize function becomes an initial script in this example.

Figure 21:
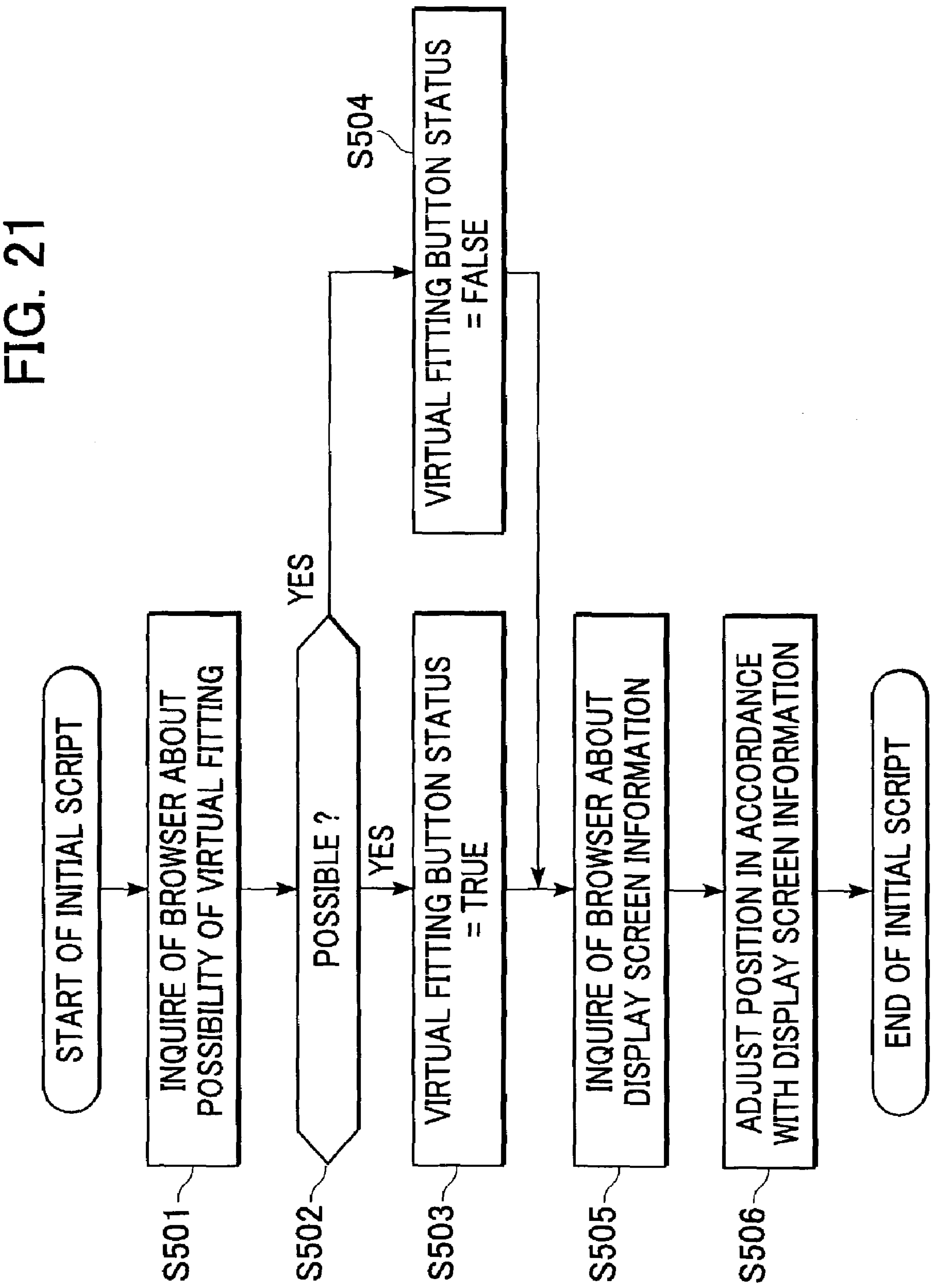
FIG. 21 is a flow diagram showing an initial script process described in the XML data.

FIG. 21 is a flow diagram of the initial script process described in the startup screen XML data shown in FIGS. 19 and 20.

In the initial script, a function is invoked to inquire of the current data broadcasting browser 201 about the working environment there, in other words, to inquire whether the digital TV receiver apparatus 100 has a virtual fitting feature (step S501 in FIG. 21).

The data broadcasting browser 201 has GetBrowserSupport ( ) as a builtin API (ApplicationProgramInterface) which is invoked from the script (corresponding to label (G) in FIG. 19). If a character sequence "fitting" as an argument is given, the API returns a value "1" (TRUE) if the digital TV receiver apparatus 100 has the virtual fitting feature or "0" (FALSE) if the digital TV receiver apparatus 100 has no virtual fitting feature.

Since the digital TV receiver apparatus 100 and the data broadcasting browser 201 of the second embodiment have a virtual fitting feature, the return value of the API is TRUE (step S503 in FIG. 21). If this script is executed on the data broadcasting browser 201 having no virtual fitting feature, the return value of the API becomes FALSE (step S504 in FIG. 21). In the above script, the return value of the API is substituted for a "visibility" attribute which decides whether or not to permit displaying of "a link button to virtual fitting page".

The script inquires of the digital TV receiver apparatus 100 about display information of the display (step S505). The data broadcasting browser 201 has GetScreenInfo ( ) as the API which is invoked from the script (see label (H) in FIG. 19). If any of four types of character sequences "height", "width", "scale", and "ratio" as an argument is designated, the API returns a return value responsive to the argument. The arguments height and width respectively represent the number of pixels in a horizontal direction and the number of pixels in a vertical direction in a maximum possible size of the still image plane 108 of the digital TV receiver apparatus 100.

The argument scale represents the number of pixels per unit length in a height direction of the display screen of the display 134. The argument ratio represents the aspect ratio of frame width to frame height of the display 134. Size "0" represents an aspect ratio of 4:3, and size "1" represents an aspect ratio of 16:9.

In the script, the size and the position of the button area are adjusted depending on the number of pixels in the height direction, and the aspect ratio of the display screen of the display 134 (step S506). The broadcast program of the second embodiment provides a moving image and a still image on a display screen having 1920×1080 pixels and an aspect ratio of 16:9. For example, as already discussed, the moving image is placed in an area extending by a width of 1536 pixels from a position 60 pixels down from the top of the screen, and by a height of 864 pixels from a position 40 pixels rightward from the left edge of the screen. If the acquired number of pixels of the display 134 in the height direction is 480, the moving image area may be changed to 336 pixels in width by 189 pixels in height.

Subsequent to the execution of the initial script, the data broadcasting browser 201 renders the button image and text on the character and drawing image plane 109 using the graphic generator 110 (step S305 in FIG. 3). At the same time, the data broadcasting browser 201 controls the image synthesizer 111, thereby synthesizing the button image and text with an image in the moving image plane 107 (step S306 in FIG. 3).

FIG. 22 shows a display screen which is generated by the data broadcasting browser from the XML data of a startup screen. As shown, a rectangular portion 701 is a moving image window, and typically presents an image on the moving image plane 107, normally presented on the entire display screen. The rectangular portion 701 thus presents an ordinary TV video in a contracted form. On the remaining portion other than the moving image window, the data broadcasting browser 201, namely, the CPU 118 displays drawings and characters rendered on the character and drawing image plane 109 using the graphic generator 110.

Also shown are a link button 702 which requests a link to a screen which provides detailed information about a commercial product introduced in the moving image window, for example, material, size and price. A link button 704 requests a shift to a screen that presents the general image of the product. A link button 705 is used to perform a virtual fitting to be discussed later, and is displayed because a variable representing the display permission attribute is TRUE. A link button 706 is used to instruct the presentation of the image of an object at the real size thereof.

General Presentation

When the user selects the "real-size presentation" link button 704 using the remote controller 132 with the main screen shown in FIG. 22 presented, the real-size display screen XML data is newly acquired. The display based on the content of the XML data is presented. The real-size display screen presents a still image which is the general image captured from an entire product.

Figure 23A:
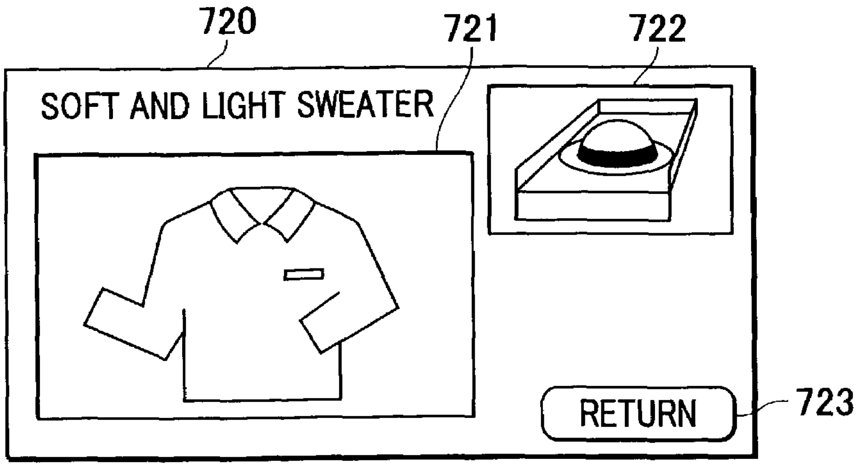
FIGS. 23A and 23B show a display screen with a general display button selected on the screen of FIG. 22.
Figure 23B:
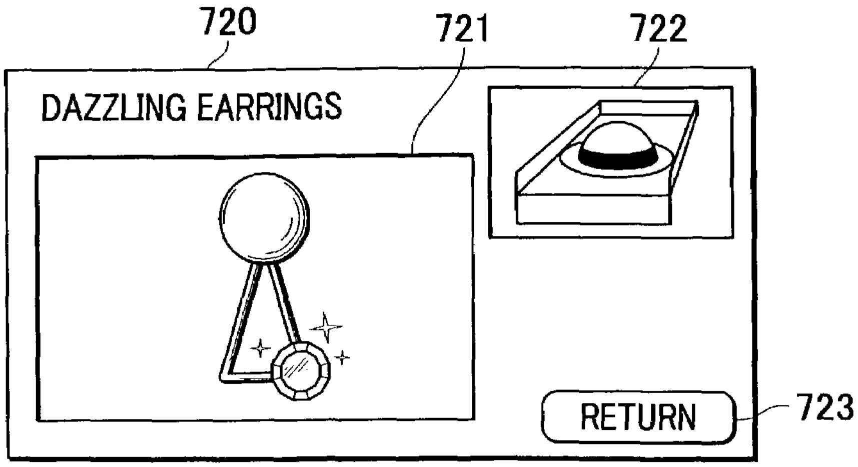

The data broadcasting browser 201 renders the received still image file data on the still image plane 108. The data broadcasting browser 201 also controls the image synthesizer 111, thereby generating a screen 720 formed of a moving image window 722 for program presentation and a still image window 721 for still image presentation as shown in FIGS. 23A and 23B, and a return button 723 for returning to the main screen shown in FIG. 22. FIG. 23A shows a "sweater" as a clothing item on the display 134, and FIG. 23B shows an "earring" as an accessory on the display 134.

Virtual Fitting Display Page

The user may select a "fitting" link button 705 using the remote controller 132 on the display shown in FIG. 22. Virtual fitting display screen XML data is newly acquired, and a screen based on the content of the XML data is presented. FIGS. 24 through 30 show the XML data.

Figure 31:
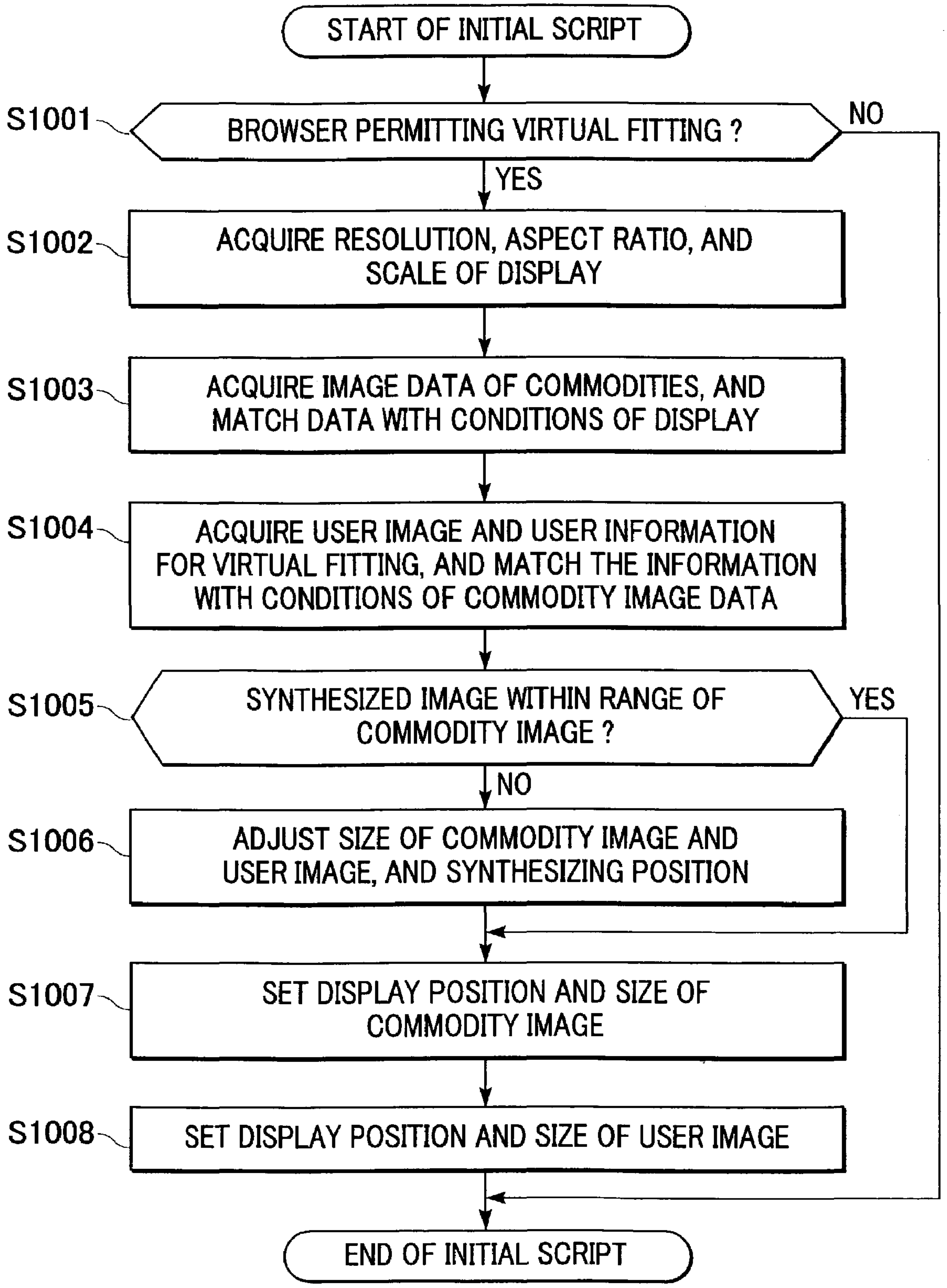
FIG. 31 is a flow diagram showing a script process described in the XML data of the virtual fitting screen shown in FIGS. 24 through 30.

FIG. 31 is a flow diagram showing an initial script process described in the XML data of the virtual fitting screen shown in FIGS. 24 through 30. The script process is performed as described below.

An acquisition process for acquiring the resolution, aspect ratio, and scale of the display 134 is performed (see step S1002 in FIG. 31 and label (A) in FIG. 24). With the resolution, aspect ratio, and scale of the display 134 acquired (see label (B) in FIG. 24), a product image is adjusted to match the display screen (step S1003). With the resolution, aspect ratio, and scale information of the user image for virtual fitting registered in the digital TV receiver apparatus 100 (see label (C) in FIG. 25), a zooming process is performed on the user image so that the product image and the user image are synthesized at a correct scale. The product image and the user image are synthesized, thereby forming a virtual fitting image (step S1004).

It is then determined whether the synthesized virtual fitting image falls within the display area of the original product image (step S1005). If it is determined that the virtual fitting image falls within the display area, the sizes and synthesis positions of the product image and the user image are readjusted (see step S1006 in FIG. 31 and label D in each of FIGS. 26 and 27).

If it is determined that the virtual fitting image falls within the display area of the original product image, the sizes and synthesis positions of the product image and the user image are readjusted. The size and display position of the product image are set (see step S1007 in FIG. 31 and label (E) in FIG. 27), and the size and display position of the user image are set (see step S1008 in FIG. 31 and label (F) in FIG. 27).

Each of the above steps is further discussed in detail.

As already discussed, the acquisition process of the screen size and aspect ratio of the display 134 in step S1002 is carried out by invoking GetScreenInfo ( ) which is the API contained in the data broadcasting browser of the present embodiment from the script.

For example, a high-definition digital TV receiver apparatus 100 is connected to the display 134 having a screen size of 19.2 inches and an aspect ratio of 16:9. If the data broadcasting browser 201 is displayed on the entire display screen of the display 134, the values of height=1080 pixels, width=1920 pixels, scale=114 pixels/inch, and ratio=1 are acquired. In the digital TV receiver apparatus 100 connected to a display 134 having a screen size of 14.6 inches and an aspect ratio of 4:3, the values of height=480 pixels, width=720 pixels, scale=54.8 pixels/inch, and ratio=0 are acquired.

When the API is invoked from the script, the data broadcasting browser 201 provides return values for "scale" and "ratio" based on information which is read from the display 134 at startup through the serial bus and then stored in the memory 112, and provides return values for "height" and "width" based on the resolution of the still image plane 108 in the digital TV receiver apparatus 100.

In broadcast program of the present embodiment, moving images and still images are broadcast on the assumption that the screen has 1920×1080 pixels and an aspect ratio of 16:9. If the still image plane 108 of the digital TV receiver apparatus 100 has a different resolution, the size and display area of the still image must be adjusted. Scale factors kx and ky in width and height directions applied to information of the product image and user image are calculated in step S1002.

The three combinations of resolution and aspect ratio of the still image plane 108 of the digital TV receiver apparatus 100 of the present embodiment are contemplated. The present invention is not limited to these combinations, and calculations corresponding to various combinations may be performed.

(1) Resolution of 1920×1080 and aspect ratio of 16:9
(2) Resolution of 720×480 and aspect ratio of 4:3
(3) Resolution of 720×480 and aspect ratio of 16:9

In the combination (1), broadcast data is directly rendered, and thus kx=ky=1.00.

In the combination (2), an image rendered on the still image plane 108 has a shorter width. The width of the product image is rendered to be longer accordingly on the still image plane 108, namely, kx>ky.

In the combination (3), an image rendered on the still image plane 108 has a longer width. The width of the product image is rendered to be shorter accordingly on the still image plane 108, namely, kx<ky.

A content producer of data broadcasting describes, in the XML data, information of image data set beforehand in step S1203 for acquiring the resolution, aspect ratio, and scale of the product image. The data broadcasting browser 201 in the script process thereof substitutes values for variables smpl_width, smpl_height, smpl_scale, smpl_guidex, and smpl_guidey.

Here, smpl_guidex, and smpl_guidey are position coordinates at which the user image overlaps the product image, smpl_scale represents a scale where the user image overlaps the product image, and is expressed in the number of pixels per unit length in a height direction. These values must be adjusted for the display 134 of the digital TV receiver apparatus 100 using kx and ky calculated in step S1002 if the display 134 has 720×480 pixels, different from the assumed resolution in the broadcasting.

The acquisition process of the user image, resolution, aspect ratio, and scale thereof in step S1004 is carried out by invoking, from the script, GetUserInfo ( ) which is the API contained in the data broadcasting browser 201.

If arguments "face", "chest", and "figure" are input, the API returns references of an image data expressing the face, the upper half of the body of a user, and the entire body of the user. These pieces of the image data of the user is the image data the user has registered beforehand in the digital TV receiver apparatus 100 for virtual fitting. To perform electronic shopping, the image data is superimposed on product image data provided by data broadcasting.

The script of the data broadcasting designates a character sequence by selecting a type of user image in use for virtual fitting in accordance with a displayed product. The resolution, aspect ratio, and scale of the user image are associated with the user image, and are obtained by referencing the user image. Like the scale of the product image, the scale of the user image is represented in the number of pixels per unit length in a height direction.

Here, "factor" is a scale factor of contraction or expansion of the user image. The scale factor is used to set the product image and the user image in the same contraction or expansion rate in a synthesis process, and is used to contract or expand the user image to obtain a dimensionally correct synthesized image. The scale factor is obtained by dividing the "scale" of the product image by the "scale" of the user image. Using the scale "factor", usr_width, usr_height, usr_guidex, and usr_guidey are adjusted. Since the aspect ratio of the user image is already adjusted to meet the display conditions of the display 134 in use, no further adjustment is required.

Figure 32:
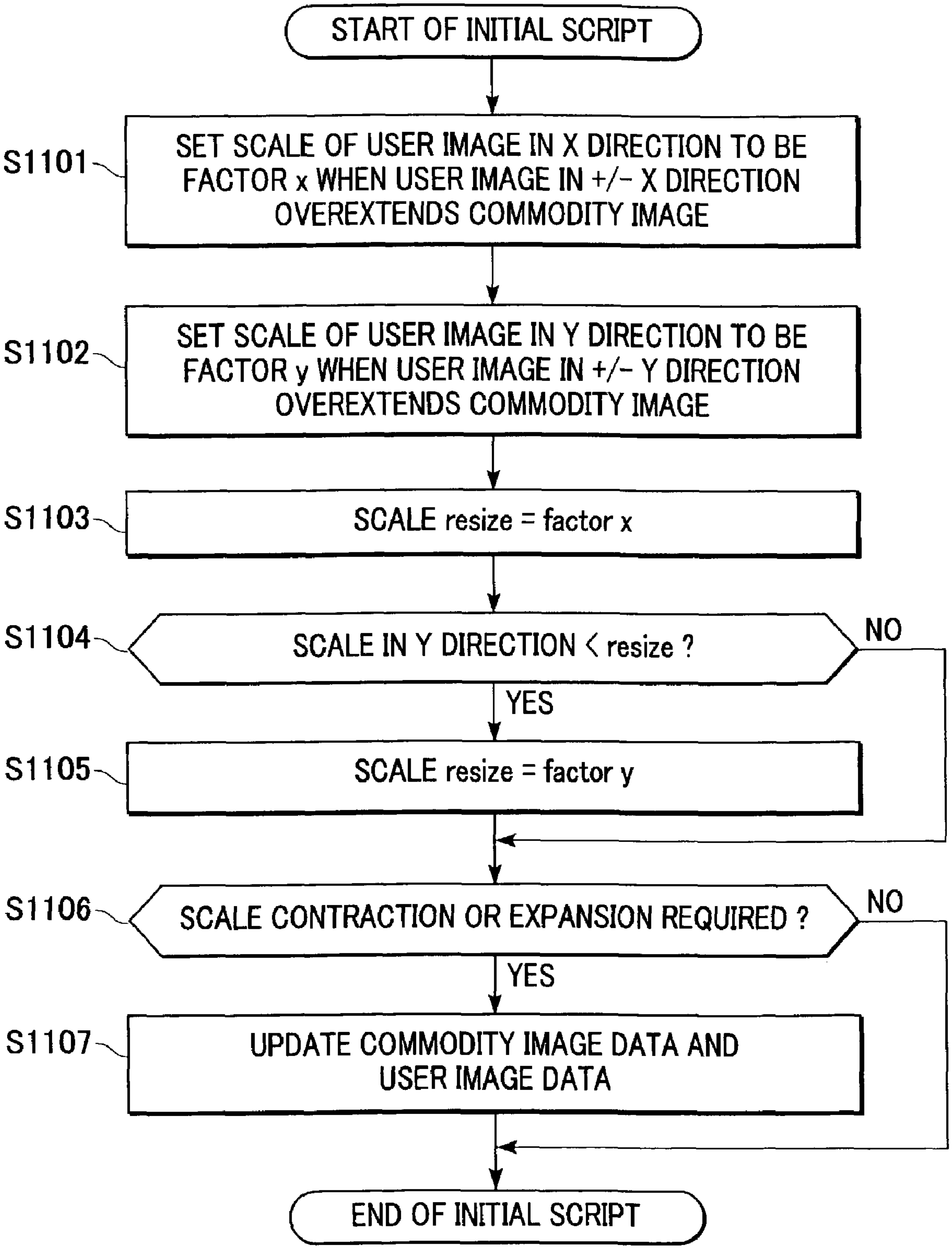
FIG. 32 is a flow diagram showing, in detail, an adjustment process of a virtual fitting image (synthesized image) in FIG. 31.

FIG. 32 shows a flow diagram of a readjustment process of the size and synthesis position of the product image and the user image as necessary so that the virtual fitting image falls within the display area of the original product image (steps S1005 and S1006).

An overextended portion of the user image beyond the product image in ±X directions is determined (step S1101). The product image contains guide coordinates (guidex and guidey) serving as a guide when the user image is synthesized (displayed in superimposition). The guide coordinates are relative coordinates having the origin thereof at the top left corner of each user image. If the user image is displayed in superimposition on the product image so that their coordinates agree with each other, a synthesized image for virtual fitting is aligned in a correct positional relationship.

The displaying of the synthesized image is performed in the procedure described in the body of the script. In step S1101, "offsetx" represents an amount of overextension of the user image in the −X direction from the product image when the two images are superimposed in accordance with the position provided by the guide coordinates, "remainx" represents an amount of overextension of the user image in the X direction from the product image, and "factorx" representing a contraction or expansion rate in the X direction is calculated so that the display area of the synthesized image falls within the display area of the original product image.

In step S1102, an overextended portion of the user image beyond the product image in ±Y directions is determined. Similarly, the scale factor "factory" in the Y direction is calculated from "offsety" and "remainy".

The process for determining a scale factor "resize" for contracting the product image and user image in (steps S1103–S1105) is selecting a value "1" requiring neither contraction nor expansion and the smallest value of "factorx" and "factory". In other words, if no overextension occurs, no contraction is required. A contraction rate in the direction of larger overextension is adopted. If no contraction is required with resize <1 (step S1106), the product image data and user image data are contracted, and the guide coordinates, and information of amounts of position adjustment "offsetx" and "offsety" of the product image required in response to the overextension of the user image are updated (step S1107).

Display Examples

Display examples of the data broadcasting browser 201 and the script process described in the virtual fitting screen XML data are discussed.

Figure 33A:
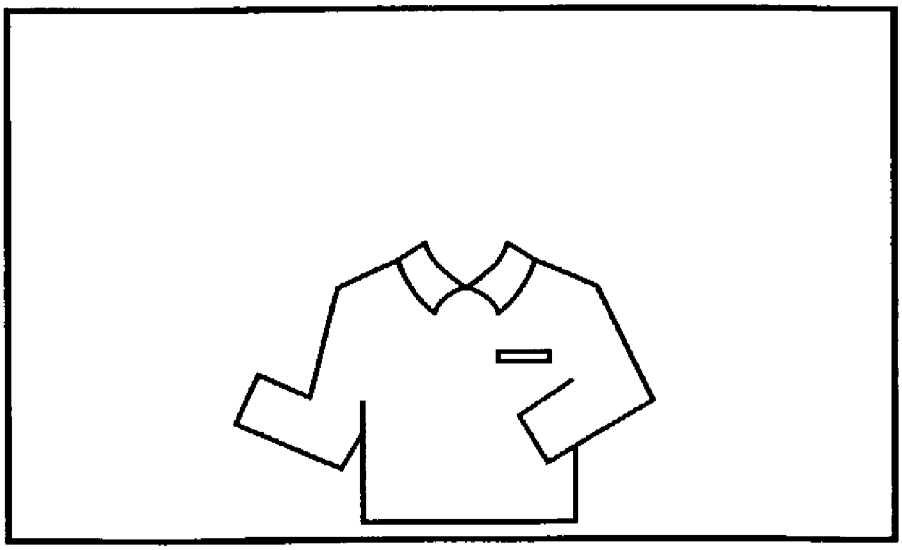
FIGS. 33A and 33B respectively show an image of a product transmitted through data broadcasting and an image of a user registered in a digital TV receiver.
Figure 33B:
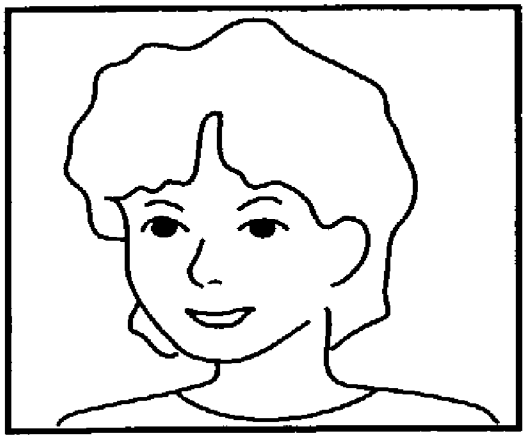
Figure 34A:
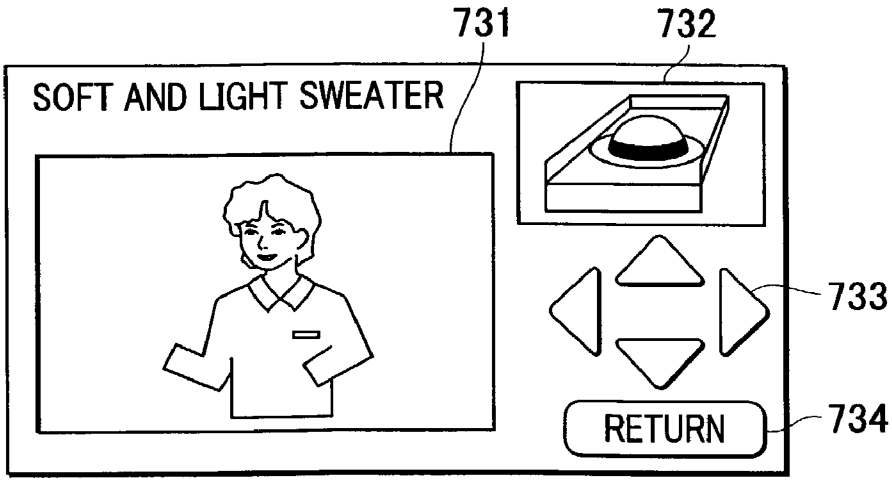
FIGS. 34A–34C show virtual fitting images (synthesized images).
Figure 34B:
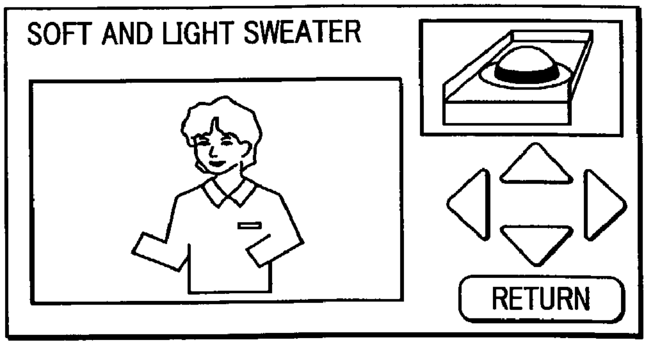
Figure 34C:
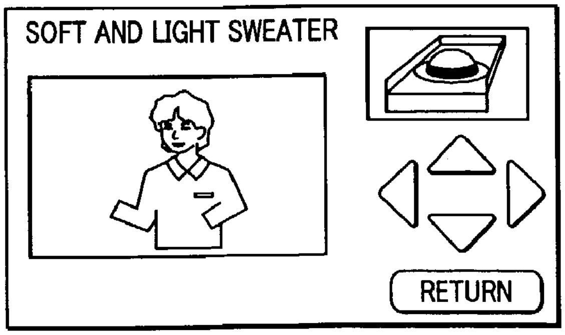

Referring to FIGS. 34A–34C, clothing "sweater" as a product is tried on. In this example, the user image of the "face" shown in FIG. 33B is registered in the digital TV receiver apparatus 100, and the product image shown in FIG. 33A is broadcast.

FIG. 34A shows a fitting image which is presented on the display 134 of the digital TV receiver apparatus 100. The display 134 has 1920×1080 pixels, an aspect ratio of 16:9, and a diagonal size of 19.2 inches. FIG. 34B shows a fitting image which is presented on the display 134 of the digital TV receiver apparatus 100. The display 134 has 720×480 pixels, an aspect ratio of 16:9, and a diagonal size of 14.6 inches. FIG. 34C shows a fitting image which is presented on the display 134 of the digital TV receiver apparatus 100. The display 134 has 720×480 pixels, an aspect ratio of 4:3, and a diagonal size of 14.6 inches.

FIG. 34A shows a still image window 731 for presenting a synthesized image, a moving image window 732 for program presentation, a shift button 733 for shifting a synthesized image within the still image window 731, and a return button 734 for returning to the main screen shown in FIG. 7 (The same is true of FIGS. 34B and 34C).

In any of the displays 134, the user image is contracted or expanded to a correct size with respect to the product image, and synthesized and displayed. In the displays 134 having specifications different from specifications assumed in the data broadcasting, respectively shown in FIGS. 34B and 34C, the user image and product image with the correct sizes and correct aspect ratios maintained are synthesized and displayed, although the layout of the on-screen images are slightly different from that shown in FIG. 34A. A correct image of the product in the virtual fitting is thus conveyed using the data broadcasting.

Figure 35A:
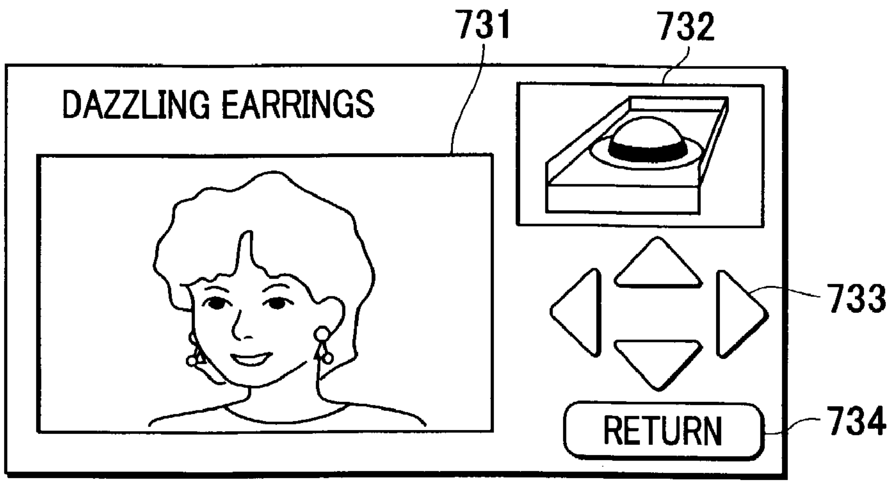
FIGS. 35A–35C show other virtual fitting images (synthesized images).
Figure 35B:
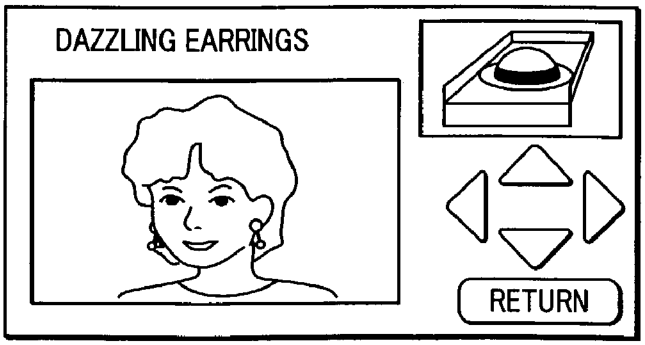
Figure 35C:
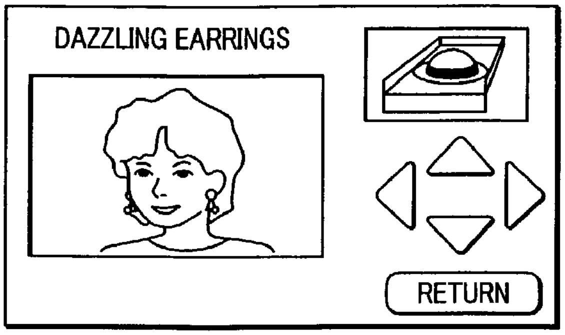

Referring to FIGS. 35A–35C, "earrings" as an accessory are tried on. FIG. 35A shows a fitting image which is presented on the display 134 of the digital TV receiver apparatus 100. The display 134 has 1920×1080 pixels, an aspect ratio of 16:9, and a diagonal size of 19.2 inches. FIG. 35B shows a fitting image which is presented on the display 134 of the digital TV receiver apparatus 100. The display 134 has 720×480 pixels, an aspect ratio of 16:9, and a diagonal size of 14.6 inches. FIG. 34C shows a fitting image which is presented on the display 134 of the digital TV receiver apparatus 100. The display 134 has 720×480 pixels, an aspect ratio of 4:3, and a diagonal size of 14.6 inches.

As shown in FIGS. 35A–35C, the user image registered in the digital TV receiver apparatus 100 is appropriately contracted or expanded, and displayed with respect to the product image data although the product (the earrings) is substantially different in size from the product (the sweater) shown in FIG. 33A. A correct product image is thus conveyed to the viewer.

In this embodiment, the scale of the broadcast image data is adjusted to match the scale of the display screen of the receiver. The scale factor is obtained by dividing the scale of the broadcast image data by the scale of the user image data which is set to be coincident with the scale of the display screen and stored. The user image data is contracted or expanded according to the scale factor, and synthesized with the broadcast image data. The synthesized image data is then displayed on the display screen.

In the data broadcasting service such as an electronic (data broadcasting) shopping in accordance with this embodiment, the user image registered in the receiver and the product image are contracted or expanded at a correct scale factor even in environments where receivers with displays having different specifications coexist. A virtual fitting is thus performed on the display screen of the TV receiver.

The electronic shopping, in which the viewer is unable to touch the product directly, conveys a correct product image to the viewer, and allows the viewer to try the product on virtually with an easy operation. The viewer thus feels "realism", and user confidence in the data broadcast TV shopping is promoted.

In the present embodiment, the data broadcasting shopping is performed in the data-broadcasting program. The virtual fitting is based on the face of the user in the above discussion. But the chest, or the entire body of the user may be used in the virtual fitting. The image of the fingers, the hand, and the arm of the user may be used to try an accessory or a wristwatch on. A building may be tried using the entire body or furniture as the user image. Furthermore, an indoor view may be used as the user image to select virtually furniture.

The present invention is not limited to the virtual fitting in the electronic shopping. The image data held for individual users with correct dimensions maintained and the broadcast data are synthesized based on the data broadcasting that is available to wide public.

The synthesis process is not limited to the still image. A content may be formed of broadcast moving images and the user image. To handle the still image, the data carousel transmission method is preferable. The moving image is preferably transmitted using a PES (PacketizedElementaryStream) method.

The process for contracting or expanding the image data of a product may be stored in the receiver rather than being contained in the transport stream transmitted in the data broadcasting. In this case, a data broadcasting apparatus simply transmits the scale of the image data as data for contraction and expansion, and is freed from the responsibility to transmit process information for expansion and contraction in accordance. The arrangement reduces the amount of transmission data and allows multimedia data to be additionally transmitted.

The present invention is not limited to the above-referenced embodiments, and finds use in any of the functions to be discussed in claims or functions performed by the above-referenced embodiments.

For example, the software configuration and the hardware configuration in the above-referenced embodiments are interchangeable with each other. The elements of the above-referenced embodiments may be combined as necessary. The construction specified in each of the claims or a part or whole of each of the above-referenced embodiments may form a single apparatus, or may be combined with another apparatus, or may be an element of an apparatus.

In accordance with the present invention, the image data obtained from data broadcasting is displayed in a form reflecting the real size of an object regardless of the specifications of the receiver. The user image and the image from the data broadcasting are synthesized and displayed at a correct scale factor. The user thus correctly judges whether or not to purchase the product in the data broadcasting shopping.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for receiving broadcast data, comprising:

a receiving unit for receiving image data of the image of an object and size information relating to the object, transmitted through data broadcasting;

an input unit for inputting from a display unit, through a connection between said apparatus and the display unit, screen information, stored in a memory of the display unit, relating to a display screen of the display unit;

a scaling unit for determining a scale factor of the object image based on the screen information input by the input unit and the size information received by the receiving unit so that the object image is displayed on the display unit at a predetermined size; and a display control unit for controlling the display unit, through the connection between said apparatus and the display unit, to display the object image expanded or contracted at the scale factor determined by the scaling unit, wherein the screen information includes both (a) a size of the display screen, the size being a physical measurement of the display screen, and (b) an aspect ratio of the display screen.

2. An apparatus according to claim 1, wherein the screen information further includes horizontal and vertical measurements of the display screen in units of pixels.

3. An apparatus according to claim 1, wherein the object image is an image captured from the object, and the predetermined size is the real size of the object.

4. An apparatus according to claim 1, wherein the receiving unit receives a plurality of types of object images of the object.

5. An apparatus according to claim 4, wherein the plurality of types of object images include at least one of a general image of the entire object and a zoom image which is captured by zooming a portion of the object.

6. An apparatus according to claim 4, wherein the scaling unit scales a second object image different in type from a first object image among the plurality of types of object images when the determined scale factor of the first object image exceeds a predetermined value.

7. An apparatus according to claim 4, wherein the scaling unit scales a second object image different in type from a first object image among the plurality of types of object images when the first object image is sized to occupy the area of the display screen at a predetermined percentage or more.

8. An apparatus according to claim 1, wherein the receiving unit receives a broadcast program formed of moving image data, while also receiving an object image, as still image data, in the program transmitted through the data broadcasting.

9. An apparatus according to claim 8, wherein the still image data is broadcast using the data carousel method.

10. An apparatus according to claim 8, wherein the display control unit determines a size of a moving image of the broadcast program based on the size of the scaled object image scaled by the scaling unit so that the moving image of the broadcast program and the object image are displayed on the same display screen.

11. An apparatus according to claim 1, wherein the connection is a serial connection.

12. An apparatus according to claim 1, wherein the physical measurement is the diagonal size of the display screen.

13. A method for displaying a data broadcast program, comprising:

a receiving step of receiving image data of the image of an object and size information relating to the object, transmitted through data broadcasting;

an input step of inputting by an apparatus from a display unit, through a connection between the apparatus and the display unit screen information, stored in a memory of the display unit relating to a display screen of the display unit;

a scaling step of determining a scale factor of the object image based on the screen information input in the input step and the size information received in the receiving step so that the object image is displayed on the display unit at a predetermined size; and a display control step for controlling the display unit, through the connection to the display unit, to display the object image expanded or contracted at the scale factor determined in the scaling step, wherein the screen information includes both (a) a size of the display screen, the size being a physical measurement of the display screen, and (b) an aspect ratio of the display screen.

14. A method according to claim 13, wherein the screen information further includes horizontal and vertical measurements of the display screen in units of pixels.

15. A method according to claim 13, wherein the object image is an image captured from the object, and the predetermined size is the real size of the object.

16. A method according to claim 13, wherein the receiving step comprises receiving a plurality of types of object images of the object.

17. A method according to claim 16, wherein the plurality of types of object images include at least one of a general image of the entire object and a zoom image which is captured by zooming a portion of the object.

18. A method according to claim 16, wherein the scaling step comprises scaling a second object image different in type from a first object image among the plurality of types of object images when the determined scale factor of the first object image exceeds a predetermined value.

19. A method according to claim 16, wherein the scaling step comprises scaling a second object image different in type from a first object image among the plurality of types of object images when the first object image is sized to occupy the area of the display screen at a predetermined percentage or more.

20. A method according to claim 13, wherein the receiving step comprises receiving a broadcast program formed of moving image data, while also receiving an object image, as still image data, in the program transmitted through the data broadcasting.

21. A method according to claim 20, wherein the display control step comprises determining a size of a moving image of the broadcast program based on the size of the object image scaled in the scaling step so that the moving image and the object image are displayed on the same display screen.

22. A computer readable medium having a stored computer program for displaying a data broadcast program, comprising:

a receiving step of receiving image data of the image of an object and size information relating to the object, transmitted through data broadcasting;

an input step of inputting by an apparatus from a display unit, through a connection between the apparatus and the display unit, screen information, stored in a memory of the display unit, relating to a display screen of the display unit;

a scaling step of determining a scale factor of the object image based on the screen information input in the input step and the size information received in the receiving step so that the object image is displayed on the display unit at a predetermined size; and a display control step for controlling the display unit, through the connection to the display unit, to display the object image expanded or contracted at the scale factor determined in the scaling step, wherein the screen information includes both (a) a size of the display screen, the size being a physical measurement of the display screen, and (b) an aspect ratio of the display screen.

23. A computer program according to claim 22, wherein the computer program is transmitted as data broadcast data.

24. An apparatus for receiving broadcast data, comprising:

a receiving unit for receiving broadcast image data transmitted through data broadcasting;

display control unit for synthesizing the broadcast image data received by the receiving unit and user image data registered beforehand and for causing a display unit to display a resulting synthesized image; and a scaling unit for scaling the broadcast image data and the user image data so that the broadcast image, the user image, and the display screen of the display unit coincide with each other in scale, wherein the scaling unit effects the scaling in accordance with screen information obtained from the display unit through a connection between said apparatus and the display unit, wherein the screen information is stored in a memory of the display unit, wherein the display control unit synthesizes the broadcast image data and the user image data scaled by the scaling unit, and causes the display unit to display a resulting synthesized image, and wherein the screen information includes both (a) a size of the display screen, the size being a physical measurement of the display screen, and (b) an aspect ratio of the display screen.

25. An apparatus according to claim 24, wherein the broadcast image data contains scaling information to indicate a scale of the image of an object represented by the broadcast image data.

26. An apparatus according to claim 24, wherein the user image data contains scaling information to indicate a scale of the image of an object represented by the user image data.

27. An apparatus according to claim 24, wherein the broadcast image data to be synthesized with the user image data contains position information which is used to synthesize the user image data onto the broadcast image data.

28. An apparatus according to claim 24, wherein the user image data contains position information which is used to synthesize the user image data onto the broadcast image data.

29. An apparatus according to claim 24, wherein the scaling unit adjusts the scale of the broadcast image data to cause the scale of the broadcast image data to coincide with a scale of the display screen of the display unit, and scales the user image data at a scale factor that is obtained by dividing the scale of the adjusted broadcast image data by the scale of the user image data that is already set to coincide with the scale of the display screen of the display unit.

30. An apparatus according to claim 24, wherein the scaling unit performs a scaling process so that the synthesized image data of the broadcast image data and the user image data falls within a display area of the original broadcast image data when the synthesized image data overextends the display area of the original broadcast image data.

31. An apparatus according to claim 24, wherein a plurality of pieces of user image data are registered, and wherein the broadcast image data contains designating information that designates user image data corresponding to an object represented by the broadcast image data.

32. A method for displaying a data broadcast program, comprising:

a receiving step of receiving broadcast image data transmitted through data broadcasting;

a display control step of synthesizing the broadcast image data received in the receiving step and user image data registered beforehand and causing a display unit to display a resulting synthesized image; and a scaling step of scaling the broadcast image and the user image so that the broadcast image, the user image, and the display screen of the display unit coincide with each other in scale, wherein the scaling step effects the scaling in accordance with screen information obtained from the display unit through a connection between an apparatus effecting said obtaining and the display unit, wherein the screen information is stored in a memory of the display unit, wherein the display control step comprises synthesizing the broadcast image data and the user image data scaled in the scaling step and causing the display unit to display a resulting synthesized image, and wherein the screen information includes both (a) a size of the display screen, the size being a physical measurement of the display screen, and (b) an aspect ratio of the display screen.

33. A method according to claim 32, wherein the broadcast image data contains scaling information to indicate a scale of the image of an object represented by the broadcast image data.

34. A method according to claim 32, wherein the user image data contains scaling information to indicate a scale of the image of an object represented by the user image data.

35. A method according to claim 32, wherein the broadcast image data to be synthesized with the user image data contains position information which is used to synthesize the user image data onto the broadcast image data.

36. A method according to claim 32, wherein the user image data contains position information which is used to synthesize the user image data onto the broadcast image data.

37. A method according to claim 32, wherein the scaling step includes adjusting the scale of the broadcast image data to cause the scale of the broadcast image data to coincide with a scale of the display screen of the display unit, and scales the user image data at a scale factor that is obtained by dividing the scale of the adjusted broadcast image data by the scale of the user image data that is already set to coincide with the scale of the display screen of the display unit.

38. A method according to claim 32, wherein the scaling step comprises performing a scaling process so that the synthesized image data of the broadcast image data and the user image data falls within a display area of the original broadcast image data when the synthesized image data overextends the display area of the original broadcast image data.

39. A method according to claim 32, wherein a plurality of pieces of user image data are registered, and wherein the broadcast image data contains designating information that designates user image data corresponding to an object represented by the broadcast image data.

40. A computer readable medium having a stored computer program for displaying a data broadcasting program, comprising:

a receiving step of receiving broadcast image data transmitted through data broadcasting;

a display control step of synthesizing the broadcast image data received in the receiving step and user image data registered beforehand and causing a display unit to display a resulting synthesized image; and a scaling step of scaling the broadcast image and the user image so that the broadcast image, the user image, and the display screen of the display unit coincide with each other in scale, wherein the scaling step effects the scaling in accordance with screen information obtained from the display unit through a connection between an apparatus effecting said obtaining and the display unit, wherein the screen information is stored in a memory of the display unit, wherein the display control step comprises synthesizing the broadcast image data and the user image data scaled in the scaling step and causing the display unit to display a resulting synthesized image, and wherein the screen information includes both (a) a size of the display screen, the size being a physical measurement of the display screen, and (b) an aspect ratio of the display screen.

41. A computer program according to claim 40, wherein the computer program is transmitted as data broadcast data.

* * * * *

UNITED STATES PATENT AND TRADEMARK OFFICE
CERTIFICATE OF CORRECTION

PATENT NO. : 7,196,733 B2
APPLICATION NO. : 10/347863
DATED : March 27, 2007
INVENTOR(S) : Shuntaro Aratani et al.

It is certified that error appears in the above-identified patent and that said Letters Patent is hereby corrected as shown below:

COLUMN 1:
Line 24, "encodes" should read --encode--.

Figure 18A:
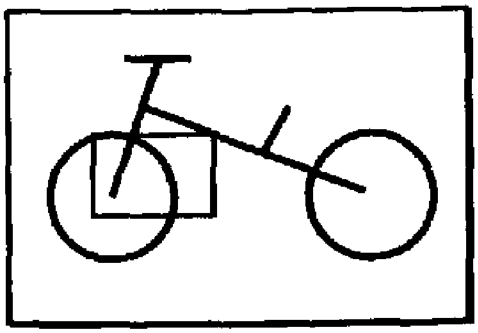
FIG. 18 shows a screen on which a real-size presentation is performed using a conventional art.
Figure 18B:
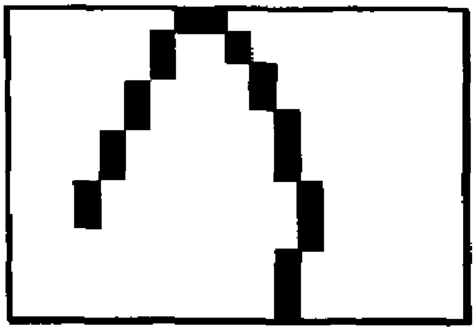

COLUMN 3:
Line 47, "FIG. 18 shows" should read --FIGS. 18A and 18B show--.

COLUMN 6:
Line 23, "store" should read --stores--.

COLUMN 20:
Line 51, "unit" should read --unit,--.

COLUMN 21:
Line 66, "display" should read --a display--.

Signed and Sealed this

Sixth Day of November, 2007

JON W. DUDAS
*Director of the United States Patent and Trademark Office*